United States Patent
Tsukamoto et al.

(10) Patent No.: US 7,297,449 B2
(45) Date of Patent: *Nov. 20, 2007

(54) OPTICAL RECORDING MEDIUM AND OPTICAL RECORDING APPARATUS

(75) Inventors: Takayuki Tsukamoto, Kawasaki (JP); Akiko Hirao, Chiba (JP); Kazuki Matsumoto, Kawasaki (JP); Hideyuki Nishizawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

This patent is subject to a terminal disclaimer.

(21) Appl. No.: 11/408,165

(22) Filed: Apr. 21, 2006

(65) Prior Publication Data

US 2006/0257748 A1 Nov. 16, 2006

Related U.S. Application Data

(62) Division of application No. 10/123,168, filed on Apr. 17, 2002, now Pat. No. 7,060,393.

(30) Foreign Application Priority Data

Apr. 18, 2001 (JP) ............................. 2001-119979
Mar. 26, 2002 (JP) ............................. 2002-087072

(51) Int. Cl.
*G03H 1/02* (2006.01)
*G11B 7/00* (2006.01)

(52) U.S. Cl. .................. 430/1; 430/2; 430/270.18; 430/58.15; 430/58.35; 430/58.5; 430/77; 430/76; 430/56; 359/3

(58) Field of Classification Search .................. None
See application file for complete search history.

(56) References Cited

U.S. PATENT DOCUMENTS 4,332,948 A 6/1982 Sakai et al.
(Continued)

FOREIGN PATENT DOCUMENTS

JP 54-083435 7/1979
(Continued)

OTHER PUBLICATIONS

T. Tsukamoto, et al., "Charge Carrier Trapping in the Photorefractive Polymer", Photorefractive Effects, Material and Devices, OSA Tops, vol. 62, pp. 391-395.
(Continued)

*Primary Examiner*—Martin Angebranndt
(74) *Attorney, Agent, or Firm*—Oblon, Spivak, McClelland, Maier & Neustadt, P.C.

(57) ABSTRACT

There is provided an optical recording medium comprising a recording layer containing a charge-generating material capable of generating a first electric charge and a second electric charge by beam irradiation, the second electric charge having a different polarity from that of the first electric charge, a charge-transport material enabling at least the first electric charge to be transported to isolate the first electric charge and the second electric charge, and a trapping material retaining the first electric charge. The optical characteristics of the recording layer is changed in accordance with changes in spatial distribution of the first and second electric charges, and the trapping material is provided with a conjugated system and with at least one nitrogen-containing heterocyclic group, and bonded through an unsaturated carbon atom of the heterocyclic group to the conjugated system.

13 Claims, 7 Drawing Sheets

U.S. PATENT DOCUMENTS

| | | | |
|---|---|---|---|
| 4,399,207 A | 8/1983 | Sakai et al. | |
| 4,973,576 A | 11/1990 | Sakamoto et al. | |
| 5,064,264 A | 11/1991 | Ducharme | |
| 5,744,267 A | 4/1998 | Meerholz et al. | |
| 5,800,950 A | 9/1998 | Hirao et al. | |
| 5,800,956 A | 9/1998 | Minemura et al. | |
| 6,090,332 A | 7/2000 | Marder et al. | |
| 6,280,884 B1 | 8/2001 | Bjorklund et al. | |
| 6,545,971 B1 | 4/2003 | Tsukamoto et al. | |
| 6,577,591 B2 | 6/2003 | Hirao et al. | |
| 6,921,624 B2 | 7/2005 | Hirao et al. | |
| 7,006,425 B1 | 2/2006 | Hirao et al. | |
| 7,060,393 B2 * | 6/2006 | Tsukamoto et al. | 430/1 |
| 2002/0041561 A1 | 4/2002 | Tsukamoto et al. | |
| 2002/0197538 A1 | 12/2002 | Tsukamoto et al. | |

FOREIGN PATENT DOCUMENTS

| | | |
|---|---|---|
| JP | 60-130744 | 7/1985 |
| JP | 62-050765 | 3/1987 |
| JP | 7-110499 | 4/1995 |
| JP | 9-22034 | 1/1997 |
| JP | 11-39881 | 2/1999 |
| JP | 11-086335 | 3/1999 |
| JP | 2000-019572 | 1/2000 |
| JP | 2000-319234 | 11/2000 |

OTHER PUBLICATIONS

H.J. Bolink, et al., "Control of Charge Trapping in a Novel Photorefractive Composite Consisting of a Bifunctional Molecule Base on TPD", Proc. SPIE, vol. 2850, pp. 69-76 (1996).

E. Hencrickx, et al., "Effect of the Chromophore Donor Group and Ferrocene Doping on the Dynamic Range, Gain, and Phase Shift in Photorefractive Polymers", Journal of Chemical Physics, vol. 113, No. 13, pp. 5439-5447 (Oct. 1, 2000).

G.G. Malliars, et al., "Charge Trapping Photorefractive Polymers", Proc. SPIE, vol. 2526, pp. 94-101 (1995).

W.E. Moerner, et al., "Polymeric photorefractive materials", Chem Rev, vol. 94, pp. 127-155 (1994).

H.J. Bolink, et al., "Photorefractive Polymers with Low Intrinsic Trap Density", Proc SPIE, vol. 3144, pp. 124-133 (1997).

Office action of Japanese Patent office.

* cited by examiner

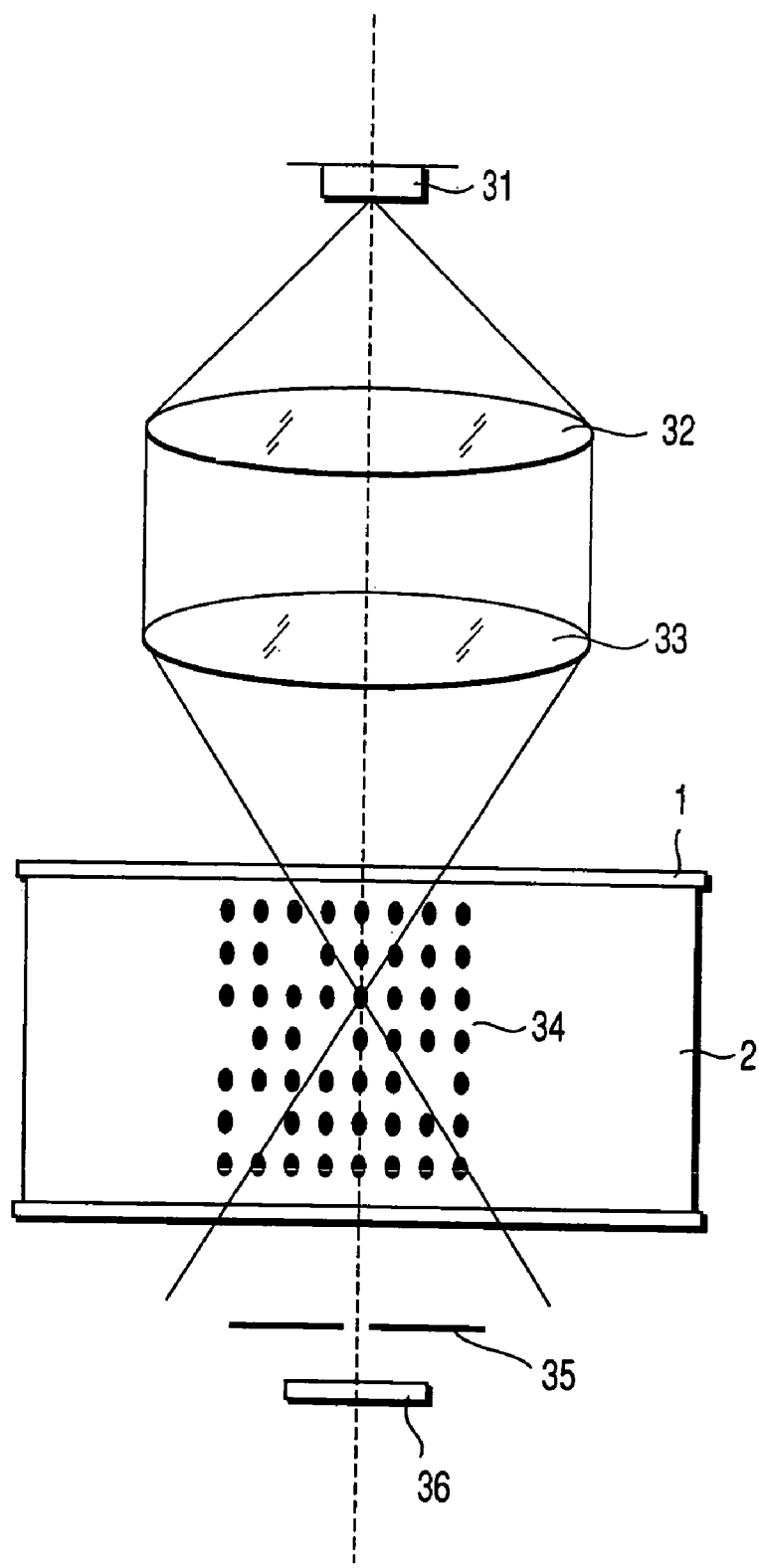
F I G. 7

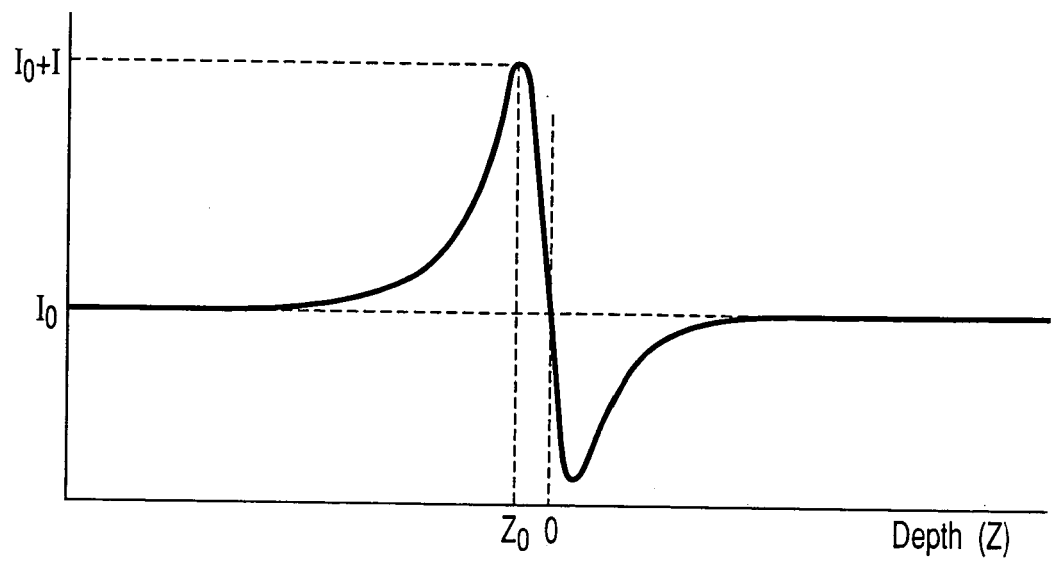
F I G. 8
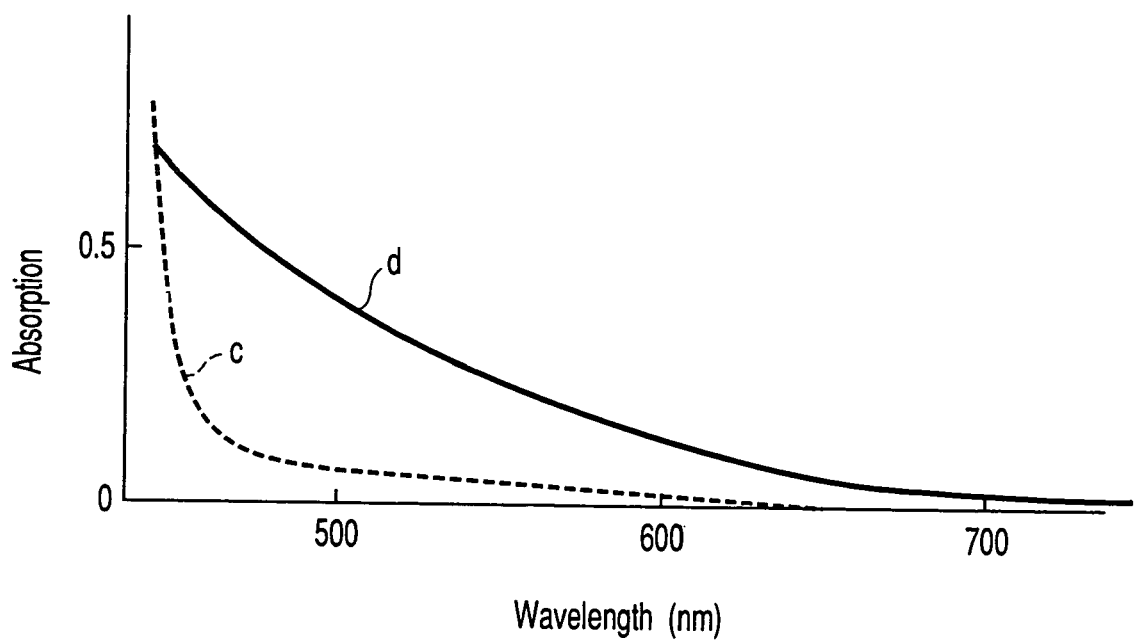
F I G. 9

ＯＰＴＩＣＡＬ ＲＥＣＯＲＤＩＮＧ ＭＥＤＩＵＭ ＡＮＤ
ＯＰＴＩＣＡＬ ＲＥＣＯＲＤＩＮＧ ＡＰＰＡＲＡＴＵＳ

This is a divisional application of U.S. application Ser. No. 10/123,168, filed Apr. 17, 2002 now U.S. Pat. No. 7,060,393.

BACKGROUND OF THE INVENTION

1. Field of the Invention

This invention relates to an optical recording medium, in particular, an optical recording medium having a recording layer where a space charge field is designed to be formed by the irradiation of beam, and also to an optical recording apparatus which is designed to record information through such an optical recording medium.

2. Description of the Related Art

As a recording medium which is capable of recording data which requires a large memory capacity such as an image of high density, an optical recording medium is known to be useful. Conventionally, as an optical recording medium, a photomagnetic recording medium and an optical phase change recording medium have been developed. However, there is still increasing demands for an optical recording medium having a capacity for recording a more increased density of information.

There has been proposed a holographic memory as an optical recording medium for realizing the recording of such an increased density of information. In this holographic memory, a page data where an optical intensity, polarization, or the phase thereof is two-dimensionally modulated is interfered with a reference light beam so as to enable information to be stored as a hologram in a recording layer. This holographic memory is designed such that the thickness of the recording layer is made large so as to enable a large quantity of holograms to be recorded in the same overlapped region by slightly changing the incident angle of the reference light beam or by slightly displacing the recording position.

As for the materials useful for the recording medium of such a holographic memory, the employment of inorganic materials have been studied in the past. In recent years however, a photorefractive medium employing an organic polymer compound is now being extensively developed because of the reasons that it no longer necessitates to manufacture a crystalline material or that it is possible to obviate the difficulties in the control of characteristics of the crystal (For example, U.S. Pat. No. 5,064,264).

This photorefractive medium is provided with a recording layer containing a charge-generating material, a charge-transport material, a trapping material and a nonlinear optical material. As a signal beam and a reference beam, both beams interfering with each other, are simultaneously irradiated onto this recording layer, information is enabled to be recorded therein in the form of interference fringes of both beams. When the same reference beam that has been employed in the recording is irradiated onto the recording layer, a reconstructed beam having the same spatial characteristics as those of the signal beam is enabled to be read.

Specifically, in the portion of the recording layer that has been irradiated by the beams, an electric charge is generated from the charge-generating material and then isolated by the charge-transport material. By enabling this isolated electric charge to be retained by the trapping material, a space charge field is formed inside the recording layer. Due to this space charge field, the refractive index of the nonlinear optical material is caused to change. Therefore, when a pair of beams interfering with each other are irradiated onto the recording layer, an intensity pattern of the beams thus irradiated is enabled to be recorded, as a change in refractive index, in the recording layer.

However, when a difference in molecular orbital energy is increased between the trapping material and the charge-transport material so as to prevent the thermal elimination of recorded data due to the thermal de-trapping from the trapping material, it becomes increasingly difficult to permit the hopping of electric charge from the charge-transport material to the trapping material. The reason for this is explained by the charge transport theory based on the small polaron hopping (D. Emin, Adv. Phys. vol. 24, 305-347 (1975)). Therefore, it would take a long time for enabling an electric charge to be trapped by the trapping material, thus necessitating a long time for recording information. On the contrary, when an electric charge is enabled to be easily hopped from the charge-transport material to the trapping material, a difference in energy between the trapping material and the charge-transport material is caused to minimize, thereby enabling the thermal elimination of recorded data. Namely, the life of record would be shortened.

On the other hand, as an alternative optical recording medium for realizing the recording of high density of information, there is known a multi-layer optical recording medium (D. A. Parthnopulous and P. M. Rentzepis, Science vol. 245, pp. 843-844 (1989)). This optical recording medium is featured, as shown in this publication, in that a recording beam is converged at an optional portion within a uniform optical recording medium to bring about a change in optical characteristics only in the vicinity of the focused point, thus recording information. Therefore, this optical recording medium differs from those where a recording layer and a non-recording layer are alternately laminated.

In this multi-layer optical recording medium also, the employment of inorganic materials has been studied (Y. Kawata, H. Ishibashi, and S. Kawata, Opt. Lett. vol. 16, pp. 756-758 (1998)). In recent years however, a photorefractive medium employing an organic polymer compound is now being extensively developed, as mentioned above, because of the reasons that it no longer necessitates to manufacture a crystalline material or that it is possible to obviate the difficulties in the control of characteristics of the crystal. According to this photorefractive medium, the optical characteristics thereof changes in proportion to the intensity of beam. However, in a recording medium where the optical characteristics thereof changes in proportion to the intensity of beam, the recording region is expanded depthwise. Therefore, the recording regions neighboring to each other are required to be sufficiently spaced apart from each other, thereby obstructing the enhancement of densification of information. As a method for narrowing the distance depthwise between the recording regions, there has been studied a method of generating electric charge by two-photon absorption (D. Day, M. Gu, and A. Smallridge, Opt. Lett. vol. 24, pp. 288-290 (1999)). However, since this method requires a very strong light source for generating electric charge by two-photon absorption, an ordinary semiconductor laser can be no longer useful in performing the recording using this method.

BRIEF SUMMARY OF THE INVENTION

Therefore, an object of this invention is to provide an optical recording medium wherein information is enabled to be recorded as a hologram, and the time required for the recording can be shortened while ensuring a practical recording life.

Another object of this invention is to provide an optical recording apparatus which is designed to record information through such an optical recording medium.

Namely, according to one aspect of the present invention, there is provided an optical recording medium comprising a recording layer containing a charge-generating material capable of generating an electron and a hole by light irradiation, a charge-transport material enabling at least the hole to be transported to isolate the electron and the hole, and a trapping material retaining the hole, the optical characteristics of the recording layer being changed in accordance with changes in spatial distribution of the electron and the hole, and the trapping material being a compound represented by the following general formula (A):

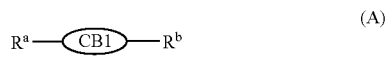
(A)

wherein CB1 is a conjugated system; and $R^a$ and $R^b$ may be the same with or different from each other and are individually a group having electron donativity, at least one of $R^a$ and $R^b$ being a nitrogen-containing heterocyclic group and bonded through an unsaturated carbon atom of the heterocyclic group to the conjugated system.

According to another aspect of the present invention, there is provided an optical recording medium comprising a recording layer containing a charge-generating material capable of generating a first electric charge and a second electric charge by light irradiation, the second electric charge having a different polarity from that of the first electric charge, a charge-transport material enabling at least the first electric charge to be transported to isolate the first electric charge and the second electric charge, and a trapping material retaining the first electric charge, the optical characteristics of the recording layer being changed in accordance with changes in spatial distribution of the first and second electric charges, and the trapping material being a compound represented by the following general formula (B):

(B)

wherein CB1 is a conjugated system; and $R^c$ is a nitrogen-containing heterocyclic group and bonded through an unsaturated carbon atom of the heterocyclic group to the conjugated system.

According to another aspect of the present invention, there is provided an optical recording medium comprising a recording layer containing a charge-generating material capable of generating a first electric charge and a second electric charge by light irradiation, the second electric charge having a different polarity from that of the first electric charge, a charge-transport material enabling at least the first electric charge to be transported to isolate the first electric charge and the second electric charge, and a trapping material retaining the first electric charge, the optical characteristics of the recording layer being changed in accordance with changes in spatial distribution of the first and second electric charges, and the trapping material being a compound represented by the following general formula (C):

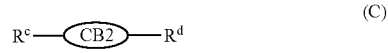
(C)

wherein CB2 is a conjugated system selected from the groups shown below:

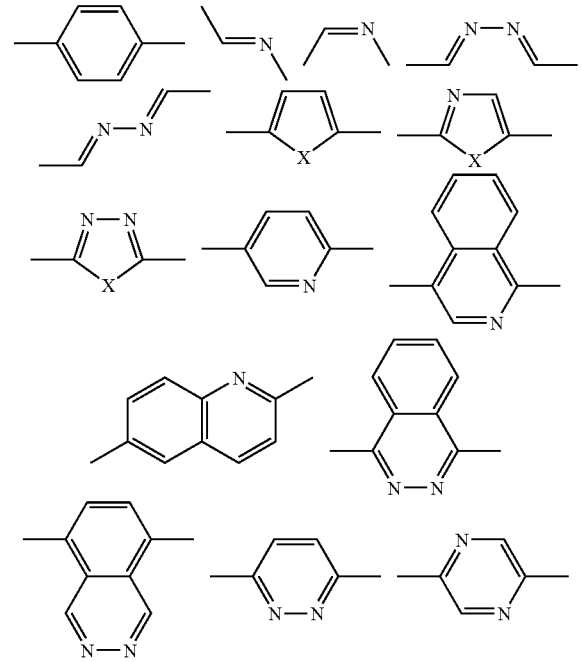

wherein X is nitrogen atom, oxygen atom or sulfur atom; and $R^c$ is a nitrogen-containing heterocyclic group and bonded through an unsaturated carbon atom of the heterocyclic group to the conjugated system; and $R^d$ is a nitrogen-containing heterocyclic group and bonded through an unsaturated carbon atom of the heterocyclic group to the conjugated system, or may be selected from the group shown below;

(1a)

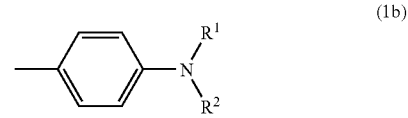
(1b)

wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of R¹ and R² being hydrogen atom, or a group to be bonded, through oxygen atom or saturated carbon atom, to nitrogen atom.

According to another aspect of the present invention, there is provided an optical recording medium comprising a recording layer containing a charge-generating material capable of generating an electron and a hole by light irradiation, a charge-transport material enabling at least the hole to be transported to isolate the electron and the hole, and a trapping material retaining the hole, the optical characteristics of the recording layer being changed in accordance with changes in spatial distribution of the electron and the hole, and the trapping material being a polymer having, at a side chain thereof, a group represented by the following general formula (A'):

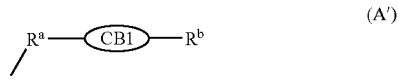

(A')

wherein CB1 is a conjugated system; and $R^a$ and $R^b$ may be the same with or different from each other and are individually a group having electron donativity, at least one of $R^a$ and $R^b$ being a nitrogen-containing heterocyclic group and bonded through an unsaturated carbon atom of the heterocyclic group to the conjugated system.

According to another aspect of the present invention, there is provided an optical recording medium comprising a recording layer containing a charge-generating material capable of generating a first electric charge and a second electric charge by light irradiation, the second electric charge having a different polarity from that of the first electric charge, a charge-transport material enabling at least the first electric charge to be transported to isolate the first electric charge and the second electric charge, and a trapping material retaining the first electric charge, the optical characteristics of the recording layer being changed in accordance with changes in spatial distribution of the first and second electric charges, and the trapping material being a polymer having, at a side chain thereof, a group represented by the following general formula (B'):

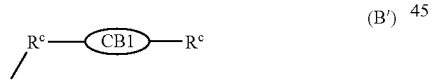

(B')

wherein CB1 is a conjugated system; and $R^c$ is a monovalent or bivalent, nitrogen-containing heterocyclic group and bonded through an unsaturated carbon atom of the heterocyclic group to the conjugated system.

According to another aspect of the present invention, there is provided an optical recording apparatus comprising:
a light source emitting a beam;
a beam splitter separating the beam into two beams;
a first optical device which is configured to provide one of these separated beams with information to be recorded;
an optical recording medium comprising a recording layer containing a charge-generating material capable of generating an electron and a hole by light irradiation, a charge-transport material enabling at least the hole to be transported to isolate the electron and the hole, and a trapping material retaining the hole, the optical characteristics of the recording layer being changed in accordance with changes in spatial distribution of the electron and the hole; and an second optical device which is configured to directing the separated beams so as to intersect each other within the recording medium, the intersecting beams making interference fringes within the recording layer of the optical recording medium to write information;
wherein the trapping material is a compound represented by the following general formula (A):

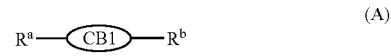

(A)

wherein CB1 is a conjugated system; and $R^a$ and $R^b$ may be the same with or different from each other and are individually a group having electron donativity, at least one of $R^a$ and $R^b$ being a nitrogen-containing heterocyclic group and bonded through an unsaturated carbon atom of the heterocyclic group to the conjugated system.

According to another aspect of the present invention, there is provided an optical recording apparatus comprising:
a light source emitting a beam;
a beam splitter separating the beam into two beams;
a first optical device which is configured to provide one of these separated beams with information to be recorded;
an optical recording medium comprising a recording layer containing a charge-generating material capable of generating a first electric charge and a second electric charge by light irradiation, the second electric charge having a different polarity from that of the first electric charge, a charge-transport material enabling at least the first electric charge to be transported to isolate the first electric charge and the second electric charge, and a trapping material retaining the first electric charge, the optical characteristics of the recording layer being changed in accordance with changes in spatial distribution of the first and second electric charges; and
an second optical device which is configured to directing the separated beams so as to intersect each other within the recording medium, the intersecting beams making interference fringes within the recording layer of the optical recording medium to write information;
wherein the trapping material is a compound represented by the following general formula (B):

(B)

wherein CB1 is a conjugated system; and $R^c$ is a nitrogen-containing heterocyclic group and bonded through an unsaturated carbon atom of the heterocyclic group to the conjugated system.

According to another aspect of the present invention, there is provided an optical recording apparatus comprising:
a light source emitting a beam;
a beam splitter separating the beam into two beams;
a first optical device which is configured to provide one of these separated beams with information to be recorded;
an optical recording medium comprising a recording layer containing a charge-generating material capable of generating a first electric charge and a second electric charge by light irradiation, the second electric charge having a different polarity from that of the first electric charge, a charge-transport material enabling at least the first electric charge to be transported to isolate the first electric charge and the second electric charge, and a trapping material retaining the first electric charge, the optical characteristics of the recording layer being changed in accordance with changes in spatial distribution of the first and second electric charges; and a second optical device which is configured to directing the separated beams so as to intersect each other within the recording medium, the intersecting beams making interference fringes within the recording layer of the optical recording medium to write information;

wherein the trapping material is a compound represented by the following general formula (C):

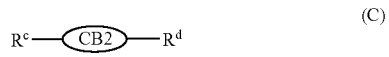

(C)

wherein CB2 is a conjugated system selected from the groups shown below:

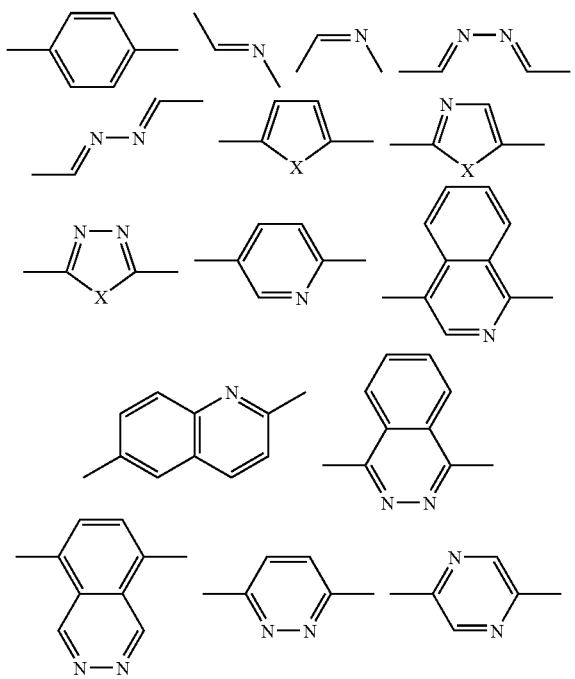

wherein X is nitrogen atom, oxygen atom or sulfur atom; and $R^c$ is a nitrogen-containing heterocyclic group and bonded through an unsaturated carbon atom of the heterocyclic group to the conjugated system; and $R^d$ is a nitrogen-containing heterocyclic group and bonded through an unsaturated carbon atom of the heterocyclic group to the conjugated system, or may be selected from the group shown below;

(1a)

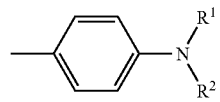

(1b)

wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom.

BRIEF DESCRIPTION OF THE SEVERAL VIEWS OF THE DRAWING

FIG. 7 is a diagram illustrating the construction of an apparatus for performing the multi-layered recording of information in an optical recording medium according to one example of the present invention;

FIG. 8 is a graph illustrating the reading data where information has been recorded over multiple layers in an optical recording medium according to one example of the present invention;

FIG. 9 is a graph illustrating the absorption spectrum of a trapping material;

DETAILED DESCRIPTION OF THE INVENTION

As a result of intensive studies on the recording layer of hologram recording medium, it has been found by the present inventors that the geometry of molecule having a group capable of capturing electric charge that has been transported has a great influence on the velocity of charge-transport.

Figure 1:
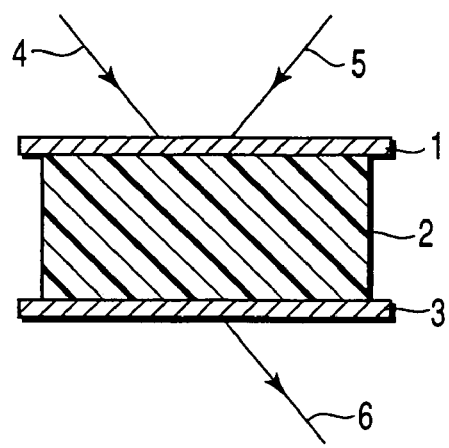
FIG. 1 is a cross-sectional view schematically illustrating an optical recording medium.

First of all, the recording and reading of information will be explained with reference to FIG. 1 wherein an optical recording medium according to one embodiment of the present invention is illustrated. At first, a laser beam is irradiated onto an optical recording medium having a recording layer 2 to record information therein. At this moment, a transparent electrodes 1 and 3 may be formed in advance on the opposite surfaces of the recording layer 2 to make it possible to perform the recording while applying a voltage between these electrodes 1 and 3. The laser beam is separated into a signal beam 4 accompanying therewith information which has been shaped into a spatial intensity distribution, polarization distribution, or a phase distribution, and a reference beam 5, this couple of beams being permitted to interfere with each other in the recording layer. In this manner, the information is recorded, as interference fringes, in the recording layer 2. When the reading beam 5 is irradiated onto the recording layer 2 under the same condition as that of the reference beam 5, a reconstructed beam 6 having the same spatial characteristics as those of the signal beam can be reconstructed. Therefore, by detecting the intensity distribution or phase distribution of the reconstructed beam 6, the information can be read. Even in the case where a voltage is applied to the optical recording medium at the time recording, the voltage is not necessarily required to be applied to the optical recording medium on the occasion of reading the information.

Figure 2A:
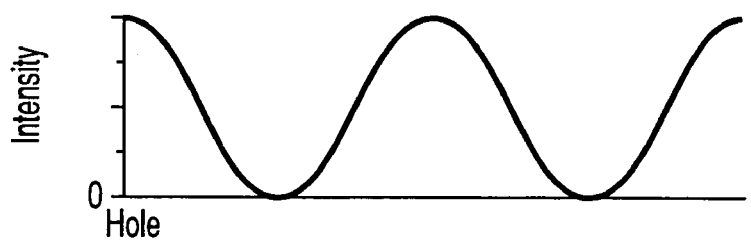
FIGS. 2A to 2D are diagrams respectively illustrating the principle of recording a hologram.
Figure 2B:
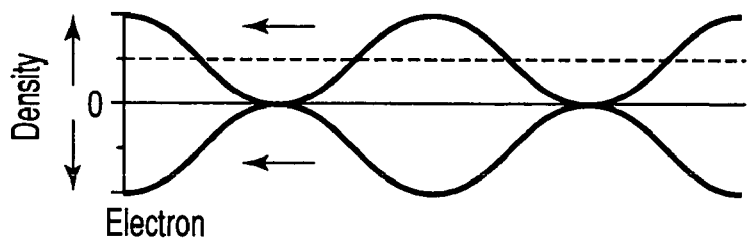
Figure 2C:
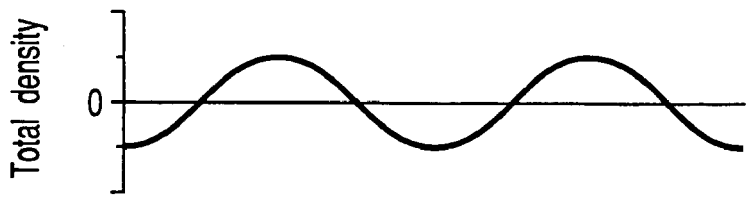
Figure 2D:
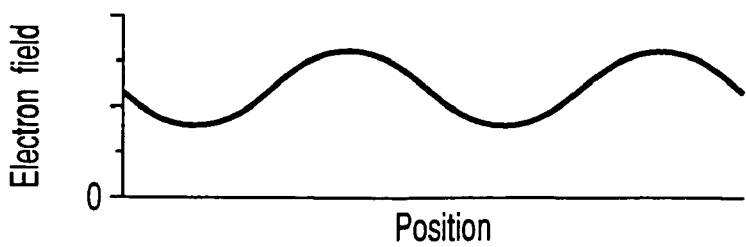

The photorefractive material is a material wherein electric charge is enabled to be generated through the irradiation of beam and to be spatially isolated, thus generating a distribution of electric charge and the space charge field at this irradiated region, through which the refractive index of the material is caused to change. Next, the principle of recording hologram will be explained with reference to FIGS. 2A to 2D. When a beam having an intensity distribution as shown in FIG. 2A is irradiated onto an optical recording medium, a distribution of electric charge is generated in a recording layer as shown in FIG. 2B. In ordinary organic photorefractive materials, only the hole is permitted to be transported, and the distribution of hole becomes spatially uniform as shown in the dotted line in FIG. 2B, provided that the following conditions are met. Specifically, the condition is that the mean free path in the direction of wavenumber vector of this interference fringes is not less than about a half of A shown in FIG. 2A. As a result, the distribution of total electric charge would become a state as shown in FIG. 2C. Since an external electric field is generally applied to the photorefractive medium, the distribution of electric field would become a state as shown in FIG. 2D. Further, in a case where a nonlinear optical material is incorporated in the photorefractive medium, the refractive index of the medium is caused to change in accordance with the intensity of electric field shown in FIG. 2D. As a result, the changes of refractive index corresponding to the distribution of the intensity of beam irradiated would be caused to be generated. In this manner, the spatial intensity distribution, polarization distribution, and/or the phase distribution of the signal beam 4 are enabled to be recorded as a form of hologram in the recording layer.

The principle of the re-distribution of the electric charge that has been generated from the irradiation of beam is consisted of two processes, i.e. the transport of electric charge and the retention of electric charge. The charge-transport material is designed to transport the optically generated electric charge by hopping conduction which can be effected through the drift and diffusion of electric charge to be enhanced by an external electric field. Further, the trapping material is designed to capture the electric charge that has been transported by the charge-transport material. The probability that the electric charge is hopped from the trapping material to the charge-transport material should be smaller than the probability that the electric charge is hopped from the charge-transport material to the trapping material. In order to realize this, a difference in molecular orbital energy between the charge-transport material and the trapping material has been taken advantage of in the past in general. In this case, the molecular orbital to be compared with each other differs depending on the polarity of electric charge to be transported by the hopping. Namely, when electron is to be transported, it is LUMO (Lowest Unocculied Molecular Orbital), whereas when hole is to be transported, it is HOMO (Highest Occulied Molecular Orbital). Therefore, when electron is to be transported, the LUMO of the charge-transport material should have a larger energy than the LUMO of the trapping material, whereas when hole is to be transported, the HOMO of the charge-transport material should have a smaller energy than the HOMO of the trapping material.

The probability that the electric charge hops once from a given charge-transport material to another charge-transport material differs greatly depending on the manner in which an electron clouds of molecules overlaps with each other as well as on the energy required for forming a polaron. This overlap integral is relatively large between the groups where the electron-donating/accepting property thereof is of the same structure with each other, but is relatively small between the groups where the electron-donating/accepting property thereof is quite different in energy and structure from one another. Therefore, in order to enable electric charge to be rapidly transported from the charge-transport material to the trapping material, it is preferable to provide both of the charge-transport material and the trapping material with a group having the same kind of electron-donating/accepting property.

As for the trapping material, it is possible to employ a compound wherein at least one nitrogen-containing heterocyclic group is bonded to a conjugated system. In this case, the nitrogen-containing heterocyclic group is required to be bonded to the conjugated system through an unsaturated carbon atom of the heterocyclic group. One example of the compounds meeting the aforementioned conditions can be represented by the following

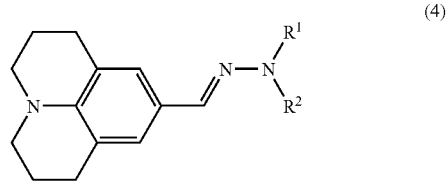

(4)

(wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom. Hydrogen atom mentioned anywhere in this specification includes heavy hydrogen.).

The molecular geometry of the compound represented by the general formula (4) was calculated with respect to the neutral state thereof as well as with respect to the ionized state thereof, and the bond length of each of these states was compared with each other. As a result, it was found that the ionized state of the compound could be nearly represented by the following general formula (4a).

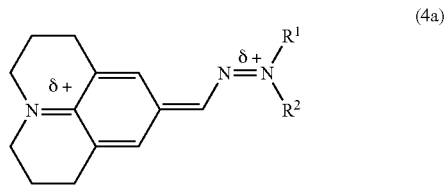

(4a)

(wherein $R^1$ and $R^2$ are the same as those of the aforementioned general formula (4)).

Figure 3:
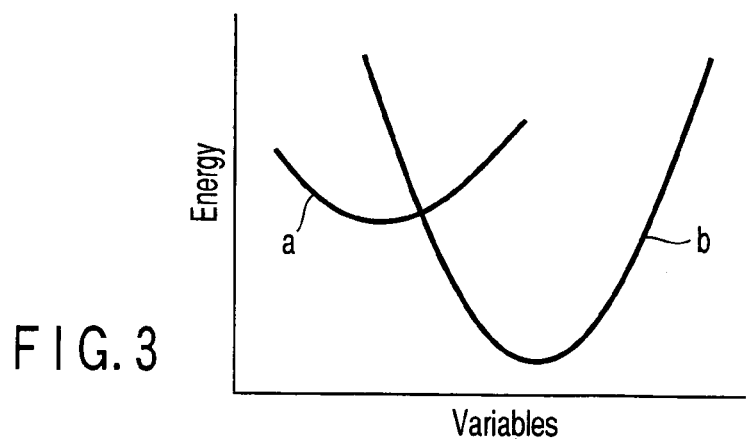
FIG. 3 is a graph for illustrating the changes of energy according to the molecular geometry of trapping materials.

Generally, the relationships between a variable such as the bond length or the bond angle and the energy of electric charge can be represented as shown in FIG. 3 wherein the abscissa represents the variable and the ordinate represents the energy of electric charge. In FIG. 3, the curve "a" denotes the energy of the neutral state, and the curve "b" denotes the energy of the ionized state. When the molecular geometry is prominently altered due to the ionization of molecule, the energy of the molecule will be lost in the form of lattice vibration due to the alteration of molecular geometry. Further, there is a great difference in molecular geometry between the neutral state and the ionized state, so that when the conjugated state is enhanced throughout the molecule, the dependency of the energy of electric charge on the molecular geometry would be further increased in the ionized state as compared with that in the neutral state as shown in FIG. 3. Namely, since the trapping material of ionized state is enabled to return to the neutral state thereof by releasing electric charge, much more energy is required in that case. Because of this, the molecular geometry is caused to alter when the molecule is ionized, so that it is possible, by using a trapping material which is capable of enhancing the conjugated state throughout the molecule, to stably retain the electric charge. Namely, the trapping material exhibiting such features has a prolonged charge retention life. In order to bring about such a structural change, the trapping material according one embodiment of the present invention is required to have a conjugated system. The conjugated system herein means a sequence of continuous conjugated bond without being cut off by a non-conjugated bond. Due to the easiness to generate the structural change, the trapping material according one embodiment of the present invention is provided with a nitrogen-containing heterocyclic group and is required to be bonded to the conjugated system through an unsaturated carbon atom of the heterocyclic structure.

By the term "conjugated system", it means a skeleton (atomic group) having two or more multiple bonds such as —C═C—, a triple bond of carbon atoms, benzene ring of para-bond, —C═N—, pyrrole, oxazole, thiazole, imidazole, 1,3,4-oxadiazole, 1,3,4-thiadiazole, 1H-1,2,4-triazole, or a combination of these groups. More specifically, the bonds shown by the following chemical formulas can be employed.

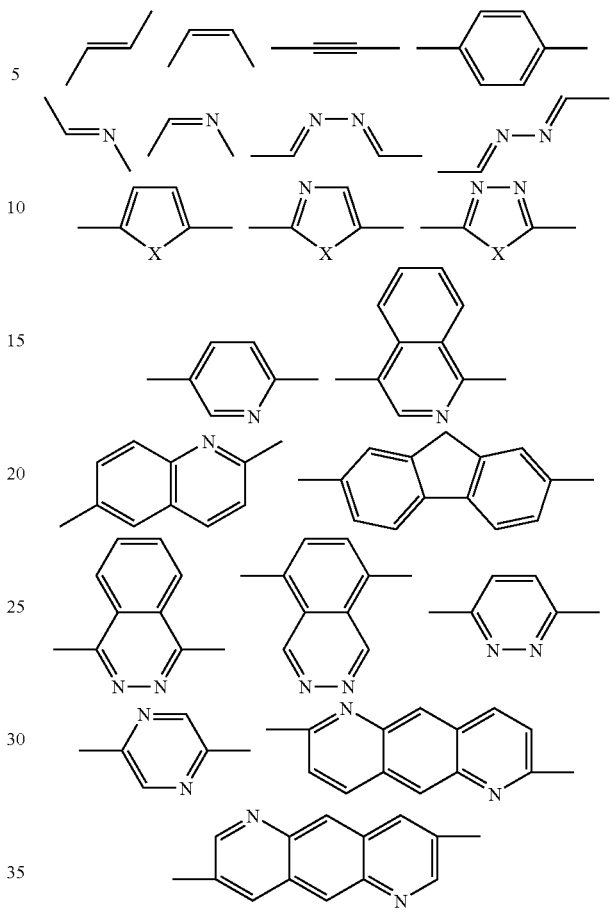

(wherein X is nitrogen atom, oxygen atom or sulfur atom.).

Especially, it is preferable that the conjugated system includes electrical active nitrogen atom having an un-paired electron. Alternatively, the employment of phenyl group of para-linkage is also preferable, because of the reason that, through the change of state between the neutral state and the ionized state thereof, the molecular geometry thereof can be prominently altered through a change in relative angle between the terminal groups.

By the way, any of the hydrogen atom in the conjugated system can be substituted by alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group. However, in order not to obstruct the geometrical change throughout the molecule, the substituent group to be incorporated should preferably be as small as possible. For example, it is preferable to employ alkyl group having not more than two carbon atoms such as methyl and ethyl, or hydroxyl group.

Among the aforementioned conjugated system, those containing a cyclic group will be restricted with regard to the site to which the terminal group containing at least one nitrogen-containing heterocyclic group would be bonded. More specifically, the site of conjugated system containing a cyclic group, to which the terminal group can be bonded, is required to be such that makes it possible to realize a structural change as shown in the aforementioned general formula (4) and general formula (4').

This structural change will be explained more in detail with reference to the following general formulas (6a), (6b), (6c) and (6d).

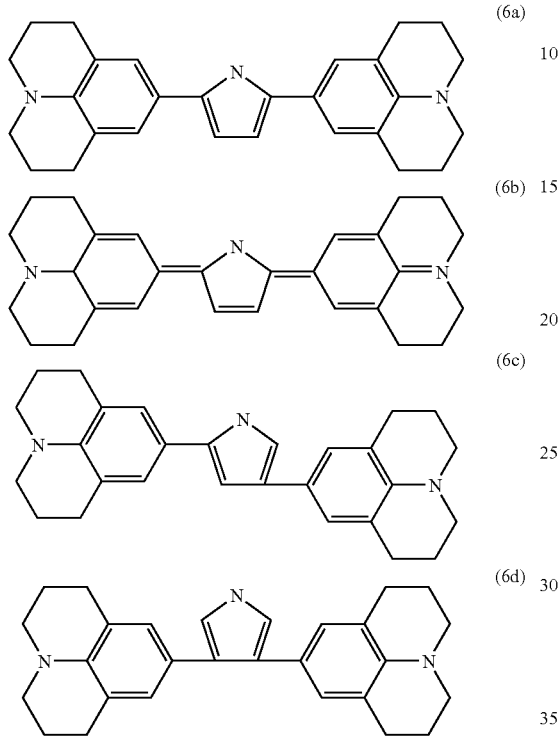

Since the compound represented by the aforementioned general formula (6a) is a molecule wherein a couple of nitrogen-containing heterocyclic groups are bonded to each other through a conjugated bond, a structural change throughout the molecule such as shown in the aforementioned general formula (6b) can be permitted to take place. The aforementioned general formulas (6c) and (6d) show structures wherein the site to which the nitrogen-containing heterocyclic group is bonded is altered. In the case of the molecule represented by the general formula (6c) or the general formula (6d), since the nitrogen-containing heterocyclic group is not bonded by a conjugated system, it is impossible to bring about a geometrical change throughout the molecule.

Because of this reason, the trapping material according to this embodiment of the present invention is required to be provided with a conjugated system.

Further, as for the nitrogen-containing heterocyclic group, it is possible to employ the following groups.

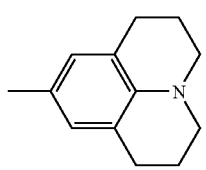

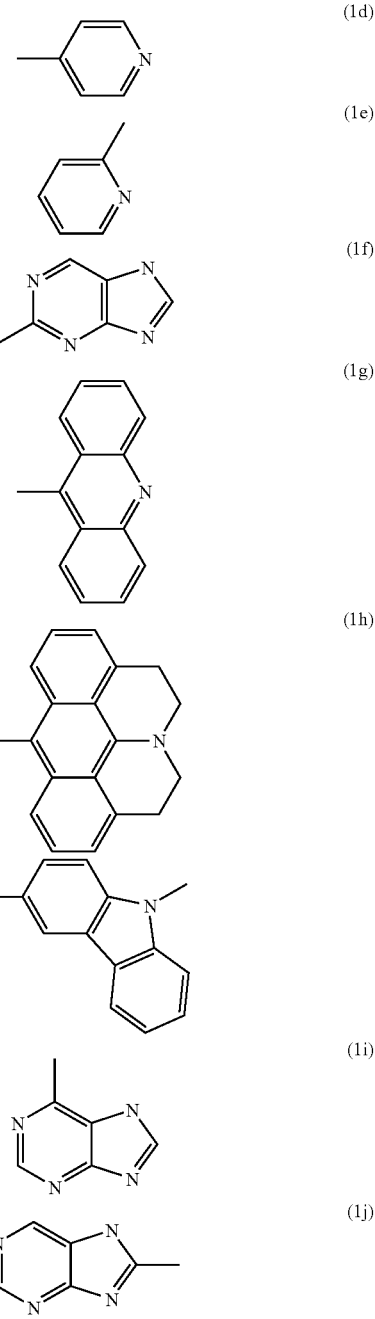

The nitrogen-containing heterocyclic groups which can be represented by the aforementioned general formula are generally provided with electron donativity. Among these nitrogen-containing heterocyclic groups, the group represented by the general formula (1c) is especially preferable. In this general formula (1c), the nitrogen atom exhibiting electron donativity is bonded to the para position of the conjugated system through an unsaturated carbon atom of the phenyl group. Therefore, the nitrogen atom is enabled to easily interact with the conjugated system. Moreover, since saturated carbon atom is included in the heterocyclic structure thereof, the nitrogen-containing heterocyclic group is relatively large in free volume and is liable to change the geometry thereof. Namely, in the case of the group represented by the general formula (1c), since the carbon atoms which constitutes a closed ring structure of single bond are located away from the plane where the phenyl group is existing, the group is enabled to have a sufficient free volume. Therefore, when the group represented by the general formula (1c) is permitted to have holes, the molecular geometry of the group can be easily changed through the conjugated system.

The trapping material according to one embodiment of the present invention can be represented by any one of the following general formulas (A), (B) and (C):

(A)

(wherein CB1 is a conjugated system; and $R^a$ and $R^b$ may the same with or different from each other and are individually a group having electron donativity, at least one of $R^a$ and $R^b$ being a nitrogen-containing heterocyclic group and bonded through an unsaturated carbon atom of said heterocyclic group to said conjugated system, and wherein hydrogen atom bonded to said heterocyclic group may be substituted by an another group.);

(B)

(wherein CB1 is a conjugated system; and $R^c$ is a nitrogen-containing heterocyclic group and bonded through an unsaturated carbon atom of said heterocyclic group to said conjugated system, and wherein hydrogen atom bonded to said nitrogen-containing heterocyclic group may be substituted by an another group.); and

(C)

(wherein CB2 is a conjugated system selected from the groups shown below:

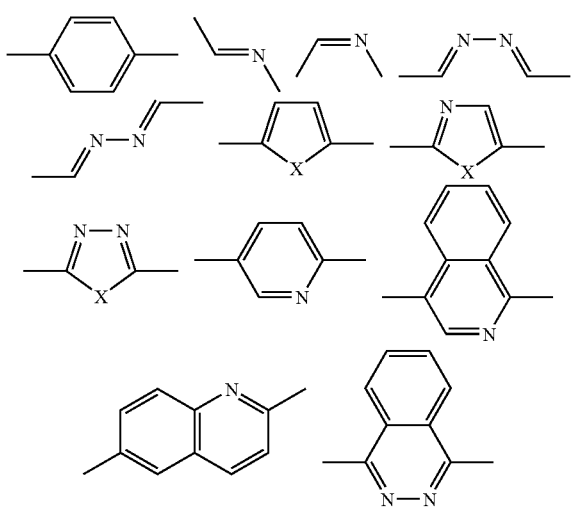

-continued

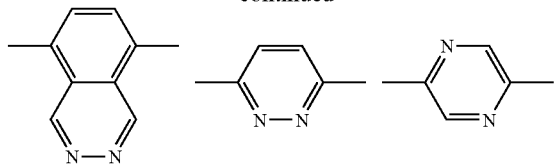

(wherein X is nitrogen atom, oxygen atom or sulfur atom.);

$R^c$ is a nitrogen-containing heterocyclic group and bonded through an unsaturated carbon atom of said heterocyclic group to said conjugated system; and $R^d$ is a nitrogen-containing heterocyclic group and bonded through an unsaturated carbon atom of said heterocyclic group to said conjugated system, or may be selected from the group shown below;

(1a)

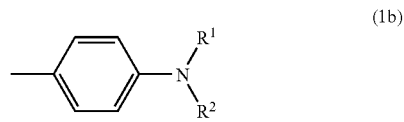
(1b)

(wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom.); and hydrogen atom bonded to said heterocyclic group included in $R^c$ and $R^d$ may be substituted by an another group.).

Next, the compounds that can be represented respectively by the aforementioned general formulas (A), (B) and (C) will be explained.

In the compounds represented by the aforementioned general formula (A), a couple of electron-donating groups are bonded to each other through a conjugated system. However, at least one of these electron-donating groups is required to be the nitrogen-containing heterocyclic group explained above.

Although there is not any particular limitation with respect to the conjugated system which is represented by CB1 in the aforementioned general formula (A), it is more preferable that the conjugated system is provided with electron donativity. Specific preferable examples of such a CB1 are as follows.

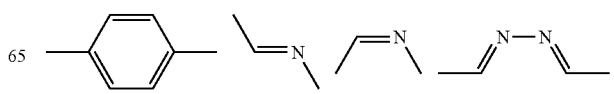

-continued

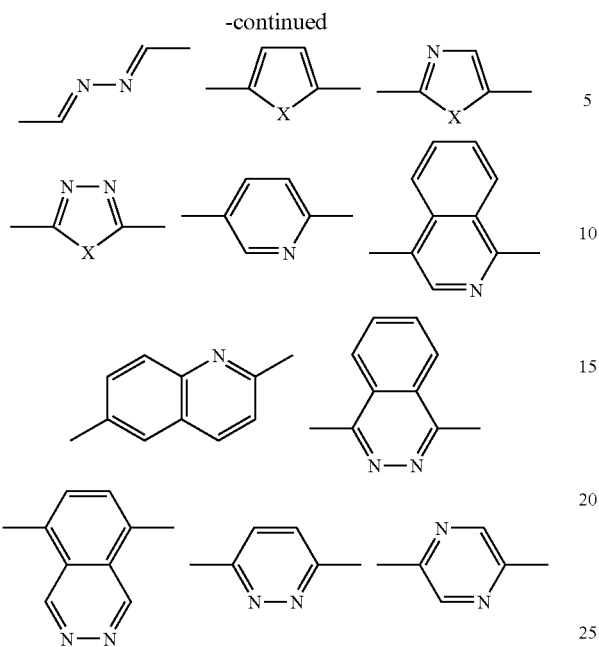

On the other hand, the other electron-donating group that can be introduced as $R^a$ and $R^b$ into the aforementioned general formula (A) may be at least one kind of material selected from the group consisting of allyl alkane; nitrogen-containing cyclic compound; oxygen-containing compound; sulfur-containing compound; and the following groups:

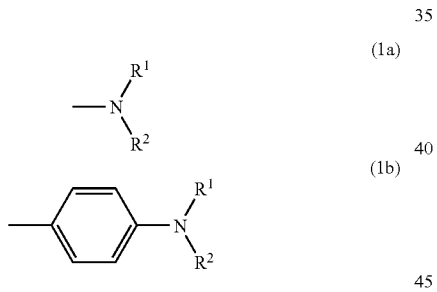

(wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom.).

Specific examples of the nitrogen-containing cyclic compound are the groups shown below, indole, carbazole, oxazole, isooxazole, thiazole, imidazole, pyrazole, oxadiazole, pyrazoline, thiazole and triazole. As for the oxygen-containing compound, it is possible to employ, for example, oxazole and derivatives thereof, oxadiazole and derivatives thereof, etc. As for the sulfur-containing compound, it is possible to employ, for example, thiazole and derivatives thereof, thiadiazole and derivatives thereof.

Among these groups, the hydrogen atom which is bonded to a site which gives a negligible influence to the charge transport may be substituted by any other group such as alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group, halogen atom, and hydroxyl group. However, in order not to obstruct the geometrical change throughout the molecule, the substituent group to be incorporated should preferably be as small as possible. For example, it is preferable to employ alkyl group having not more than two carbon atoms such as methyl and ethyl, or hydroxyl group. If any of these substituent groups is to be incorporated together with other kinds selected from these groups, they are not necessarily of the same kinds.

By the way, even if a couple of electron accepting groups are employed in place of the electron donating groups and bonded to each other through the conjugated system, it would be useful as a trapping material. In this case however, the conjugated system should preferably be electron-acceptive. One example is represented by the following formula.

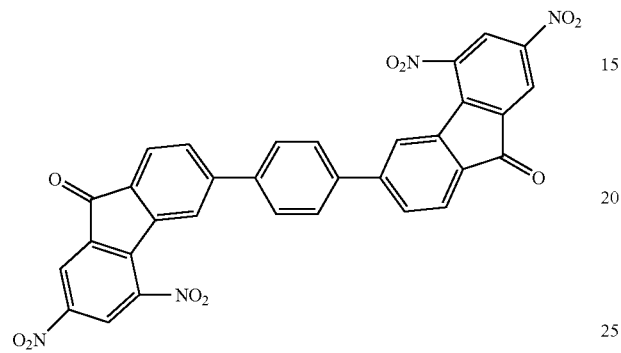

In the compounds represented by the aforementioned general formula (B), a couple of the aforementioned nitrogen-containing heterocyclic groups are bonded to each other through a conjugated system.

Although there is not any particular limitation with respect to the conjugated system to be introduced as the CB1 in the aforementioned general formula (B), the same kinds of conjugated systems as explained with reference to the aforementioned general formula (A) can be preferably employed. On the other hand, as for the nitrogen-containing heterocyclic group to be incorporated as the $R^c$ in the aforementioned general formula (B), the following groups can be employed.

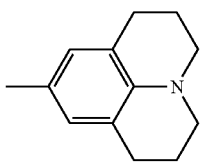
(1c)

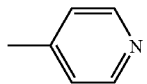
(1d)

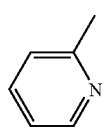
(1e)

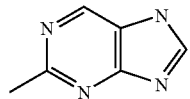
(1f)

-continued

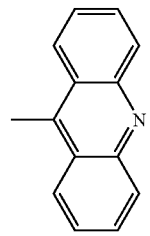
(1g)

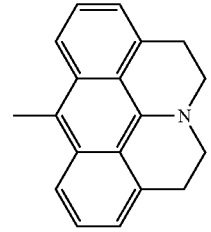
(1h)

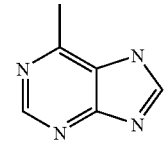
(1i)

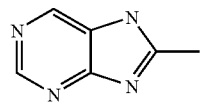
(1j)

Among these groups, since the structural change is easily occurred, the group represented by the general formula (1c) is more preferable.

In the case where a couple of the nitrogen-containing heterocyclic groups that have been bonded to each other through the conjugated system CB1 are the same with each other, the compound represented by the aforementioned general formula (B) would become symmetrical as a whole. Namely, the compound to be obtained in this manner may be linearly symmetrical in structure.

In the compounds represented by the aforementioned general formula (C), a nitrogen-containing heterocyclic group $R^c$ and a specific group $R^d$ are bonded to each other through a conjugated system. However, the conjugated system to be incorporated as the CB2 in the general formula (C) should be selected from the following groups.

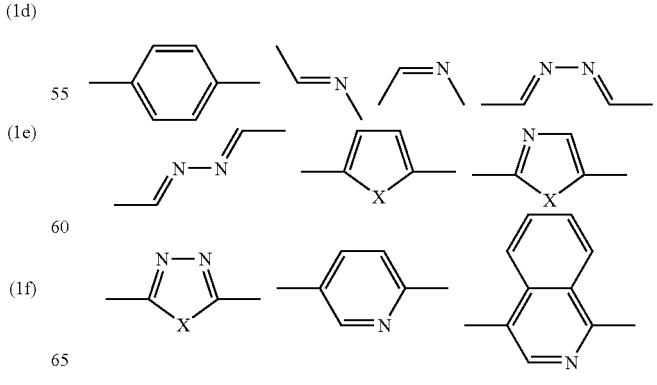

-continued

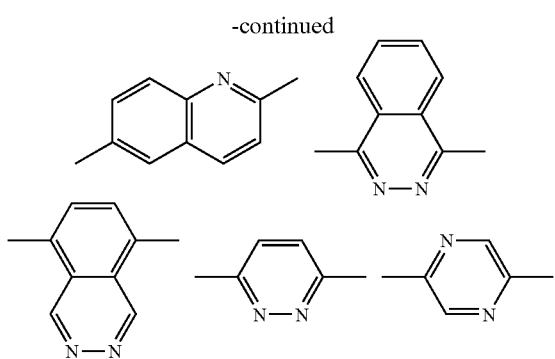

(wherein X is nitrogen atom, oxygen atom or sulfur atom.).

On the other hand, the group that can be introduced as the $R^d$ into the aforementioned general formula (C) may be a nitrogen-containing cyclic compound or a group represented by the following general formula (1a) or (1b):

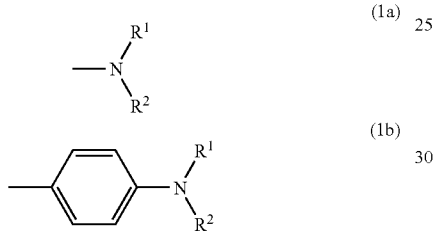

(wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom.).

In addition to the compounds represented by the aforementioned general formulas (A) to (C), a compound consisting of a molecule having a geometry wherein two or more electron-donative groups are spatially overlapped may be employed as the trapping material.

By the expression of "a geometry wherein two or more electron-donative groups are spatially overlapped", it means a geometry wherein two or more electron-donative groups are respectively formed of a planar structure, so that when a trapping material is projected in a direction perpendicular to the plane of one of the electron-donative groups, these electron-donative groups are observed in a overlapped state, and hence a geometry wherein two or more electron-donative groups are directly intersected with each other would be excluded from the aforementioned definition.

In the case where the electron-donative groups are formed of a planar structure, even if a couple of the electron-donative groups are not bonded with each other through a conjugated system, the charge retention property of the molecule through the geometrical change thereof can be improved. This phenomenon can be explained as follows. Namely, if it is assumed that the symmetry axes of the electron-donative groups are slightly offset under a neutral state. In this molecule, when electric charge is injected into one of these two electron-donative groups, the stability of the molecule under the neutral state is collapsed, so that a structural change is possibly caused to occur so as to align these symmetry axes of these two groups with each other. When these symmetry axes of these two groups are aligned with each other, the interaction between these two groups is sharply increased, so that the energy of the molecule is caused to change prominently as compared with the case where these two groups existed independently. Therefore, when the molecule is constructed in this manner, the charge retention property of the molecule can be improved.

This phenomenon will be further explained with reference to the compounds represented by the following chemical formulas (41) and (42).

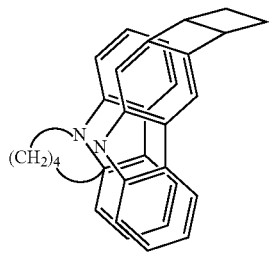

(41)

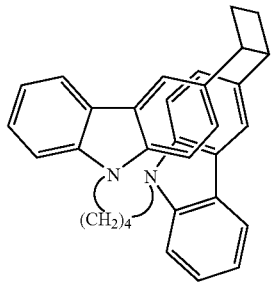

(42)

The compounds represented by the chemical formulas (41) and (42) are provided respectively with carbazolyl group as an electron-donating group having a planar structure. Whether or not this carbazolyl groups is spatially overlapped with another one can be determined by a fluorescence spectrum for instance.

Figure 4A:
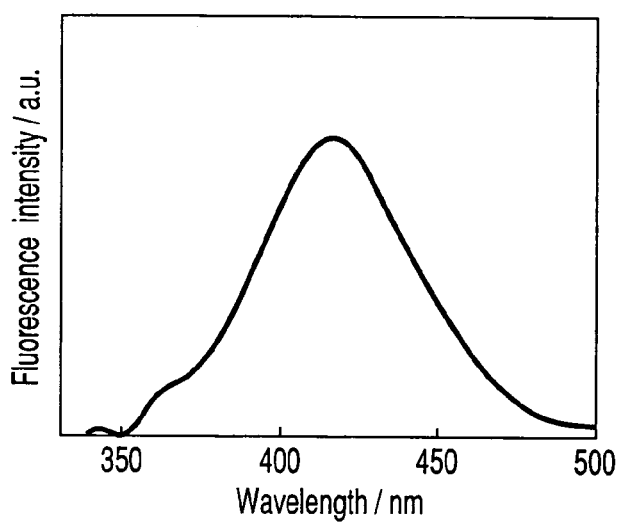
FIGS. 4A to 4C are graphs respectively illustrating the fluorescent spectrum of a compound having carbazolyl group.
Figure 4B:
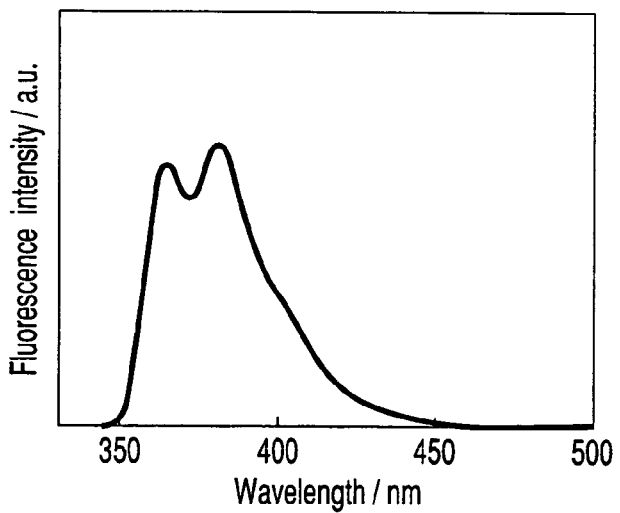
Figure 4C:
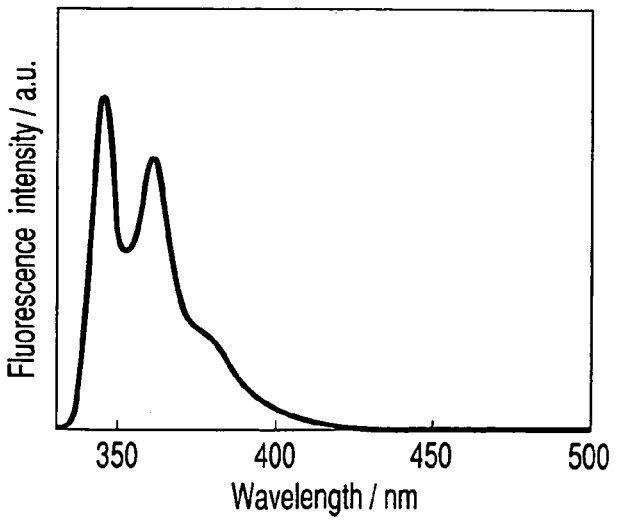

The fluorescence spectrums of these compounds are shown in FIGS. 4A and 4B. FIG. 4C shows the fluorescence spectrum of N-ethylcarbazole. By the way, the measurement of these fluorescence spectra was performed in a solution of cyclohexane at room temperature and using an exciting light source 310 nm in wavelength.

The molecules represented by these chemical formulas (41) and (42) are the same with each other. However, in the compound represented by the chemical formula (41), carbazolyl groups are spatially overlapped with each other. Due to this geometrical difference, these two compounds exhibit quite a different fluorescence spectrum from each other as shown in FIGS. 4A and 4B.

Specifically, in the case of the compound represented by the chemical formula (42) (FIG. 4B), the compound exhibit the same fluorescence spectrum as that of N-ethylcarbazole (FIG. 4C) excepting that the width of the spectrum thereof is slightly enlarged and that the wavelength thereof is slightly shifted toward the longer wavelength side. Therefore, it is assumed that in the case of the molecule shown in the chemical formula (42), a couple of carbazolyl groups are not spatially overlapped but are permitted to function independently. On the other hand, in the case of the molecule represented by the chemical formula (41) (FIG. 4A), the center thereof is more prominently shifted toward the longer wavelength side than that of the compound shown in FIG. 4C, and a spectrum having a greatly expanded width can be observed. This indicates the fact that since a couple of carbazolyl groups are spatially overlapped with each other, an interaction is caused to generate between these carbazolyl groups.

As explained above, when, as a result of the observation of the fluorescence spectrum of the molecule, the spectrum obtained is recognized as being different in structure from the spectrum to be obtained where a specific group is existed only one, it can be said that there is an interaction between a couple of the specific groups in the molecule.

Examples of such an electron-donating group having a planar structure include a nitrogen-containing cyclic compound such as indole, carbazole, isooxazole, imidazole, pyrazole, pyrazoline, triazole, purine, acridine, pyridine, and quinoline; an oxygen-containing compound such as oxdazole and derivatives thereof, and oxadiazole and derivatives thereof; and sulfur-containing derivatives such as thiazole and derivatives thereof, and thiadiazole and derivatives thereof.

The trapping materials described above are capable of changing their molecular geometry through the retention of electric charge, thus resulting in the changes of optical characteristics thereof (i.e. characteristics that can be represented by an optical constant such as refractive index, absorbance, etc.). In the case of the trapping material where a couple of electron-donating groups or a couple of nitrogen-containing heterocyclic groups are coupled to each other through a conjugated system, the changes of these optical characteristics can be directly utilized in the optical recording. In this case, when an electric charge is generated from a charge-generating material due to the irradiation of beam, the electric charge is transported and retained in the trapping material. When the trapping material retains the electric charge, the molecular geometry and the optical characteristics of the trapping material are changed. As a result, the information is recorded in the recording layer as distribution of trapping materials retaining the electric charge. Therefore, in the case of the optical recording medium of this kind, the conventional non-linear optical materials whose optical characteristics can be changed by electric field are no longer necessitated.

Even in the case of the optical recording medium where the recording of information is achieved through the changes in optical characteristic of the trapping material as described above, it is possible to perform the recording and reading of information in the same manner as conventionally employed. The principle of the phenomenon to generate changes in optical characteristics of the optical recording medium in accordance with the distribution of intensity of irradiated beam will be explained with reference to FIGS. 2A to 2D.

In contrast with the conventional photorefractive medium, when the mean free path of hole to be transported is sufficiently small relative to $\Lambda$, the distribution of hole does not substantially change. Therefore, the distribution of electric charge as shown in FIG. 2C would not be generated. Therefore, the distribution of space charge field as shown in FIG. 2D also is not generated irrespective of the existence or non-existence of external electric field, so that even in the case of the medium containing a non-linear optical material, changes in optical characteristics thereof in conformity with the distribution of the intensity of beam would not be generated. In the case of the optical recording medium where the recording of information is achieved through the changes in optical characteristic of the trapping material, if the trapping material represented by the aforementioned general formula (4) is dispersed therein, the trapping material retaining electric charge is permitted to exist in a large quantity in the region where a large quantity of electric charge is caused to generate due to a strong intensity of beam. The trapping material retains the electric charge only in the region in which the light intensity is high, and the optical characteristics of the trapping material are changed. Namely, in conformity with the distribution of intensity of beam, the optical characteristics would be caused to change. In this case, if the mean free path of electric charge in the direction of wavenumber vector becomes almost the same as that of $\Lambda$, the distribution of the trapping material retaining electric charge would become uniform as shown in FIG. 2C, so that any local change in optical characteristics would not be generated.

As far as the mean free path of the optically produced electric charge is concerned, the aforementioned optical recording medium differs from those containing a non-linear optical material.

Even in the aforementioned optical recording medium, the compounds described above can be employed as a trapping material. As mentioned above, the compound represented by the general formula (4) is enabled to change the molecular geometry thereof as electric charge is retained therein, so that the electric charge can be stably trapped. If the trapping material contains, in the molecule thereof, two or more electron-donating groups or nitrogen-containing heterocyclic groups, a couple of electric charges can be retained therein. In that case, a more enhanced geometrical change would be brought about as compared with the molecule retaining therein only one electric charge. Specifically, the geometry would become much close to the state shown by the general formula (4a), so that the conjugated system would be further strengthened throughout the molecule. Therefore, when a couple of electric charges is retained as mentioned above, the life of the retained electric charge would be further prolonged and at the same time, the changes of optical characteristics would become more prominent, thereby making it possible to realize an ideal state.

When investigations were performed with regard to the absorption peak wavelength in the neutral state represented by the following formula (16) and in the state wherein a couple of electric charges were retained in molecule, the following results were obtained. Namely, an absorption peak in the neutral state was admitted in the vicinity of 290 nm, whereas an absorption peak in the state wherein a couple of electric charges were retained in molecule was admitted in the vicinity of 713 nm. The alteration of absorption in this manner accompanies, according to the relation of Kramers-Kronig, the alteration of refractive index. Therefore, it will be clearly understood that when the changes in geometry are caused to generate in the trapping material due to the retention of electric charge, the optical characteristics such as absorption coefficient and refractive index are also caused to change.

(16)

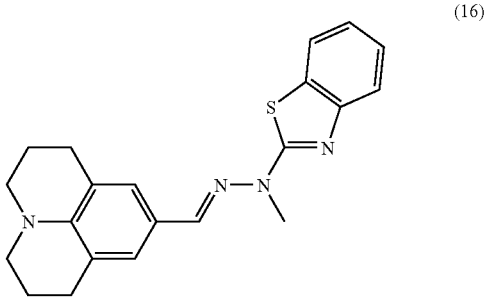

However, in the case where a trapping material is dispersed in a matrix polymer of this optical recording medium, the structural change is not always taken place at every occasions when the trapping material receives electric charge. Generally, when a structural change is caused to occur, electric charge is deprived of its energy and, therefore, is stably retained by the trapping material. Occasionally, the electric charge may be transported to another electron-donating group before the structural changes are taken place. Otherwise, the electric charge may be transported over a plurality of trapping materials. Therefore, the separation of electric charge to be generated from the charge-generating material may happen to be generated only from the trapping material too. Of course, it is preferable, for the purpose of effectively generating the dissociation of electric charge, to incorporate a charge-transport material in separate from the trapping material.

When a couple of coherent beams are irradiated onto the recording layer containing such a trapping material, changes in optical constant and having the same cycle as the interference fringes would be generated provided that the mean free path of the interference fringes of electric charge in the direction of wavenumber vector is sufficiently smaller than the $\wedge$. Therefore, when one of the beams generating the interference fringes is shut off, a diffracted beam can be observed.

Further, when a recording beam is converged on this recording layer, a large quantity of electric charge would be generated in the vicinity of the focal point, so that when the mean free path of electric charge is not larger than the beam diameter at the beam waist, a greater number of the trapping material are enabled to retain electric charge in the vicinity of the focal point. Especially, since the electric charge is permitted to generate all at once in a very narrow region in the vicinity of focal point in this recording method, the probability of enabling a single trapping material to retain a couple of electric charges will be increased. This probability of enabling a single trapping material to retain a couple of electric charges would be proportional to a square of the density of electric charge, if it is considered in a most simple way. On the other hand, since the number of electric charge to be generated by the irradiation of beam is proportional to the intensity of beam, the probability of enabling a single trapping material to retain a couple of electric charges would become proportional to a square of the intensity of beam. For this reason, it become possible to bring about changes of the optical constant only in a narrower region.

The mixing ratio of the trapping material in the optical recording medium may be determined in such a way as to enable an average distance between trapping property-provided units to fall within a desired range. The density of the optical recording medium can be determined from the weight and volume of the medium. The amount of the trapping material in the optical recording medium can be determined from the molecular weight and mixing ratio of the trapping material. On the basis of above-mentioned factors, an average distance between trapping property-provided units can be determined.

In the case where the recording layer contains a non-linear optical material, the mean transport path of electric charge is required to be not less than about $\wedge/2$. Therefore, an average distance between trapping property-provided units (hereinafter referred to as average inter-unit distance) should preferably be within the range of 1.0 nm to 4.0 nm. Although it depends on the kinds of trapping material, if the average inter-unit distance is 1.0 nm, the content of the trapping material would become about 40% by weight based on the entire weight of the recording layer, and if the average inter-unit distance is 4.0 nm, the content of the trapping material would become about 1% by weight. If the content of the trapping material is too small, it would take a long time for enabling optically generated electric charge to be captured by the trapping material, thus requiring a long time for the recording. On the other hand, if the content of the trapping material is too large, the optically generated electric charge would be trapped before the electric charge is sufficiently isolated, so that it would become difficult to establish a sufficient magnitude of space charge field.

On the other hand, if it is desired to employ the recording layer as an optical recording medium where the mean transport path of electric charge is sufficiently smaller than the $\wedge$, an average inter-unit distance should preferably be within the range of 0.9 nm to 1.3 nm. Although it depends on the kinds of trapping material, if the average inter-unit distance is 0.95 nm, the content of the trapping material would become about 60% by weight based on the entire weight of the recording layer, and if the average inter-unit distance is 1.3 nm, the content of the trapping material would become about 20% by weight If the content of the trapping material is too small, the mean free path of electric charge would be enlarged, so that it would be difficult to generate a sufficient degree of changes in optical characteristics in conformity with the distribution of the intensity of beam. On the other hand, if the content of the trapping material is too large, the aggregation and crystallization among the trapping materials would be caused to generate, so that it may become impossible to form a recording layer containing uniformly dispersed molecules. The optically generated electric charge is transported by hopping from a charge-generating material to a charge-transport material, and from one of the charge-transport materials to another one, thus enabling it to be ultimately captured by the trapping material. If the content of the charge-transport material is too large, the mean free path of electric charge would be enlarged, so that it would become difficult to generate a sufficient degree of changes in optical characteristics in conformity with the distribution of the intensity of beam.

By the way, when the trapping material is incorporated into the recording layer so as to enable an average inter-unit distance to fall within the range of 1.0 nm to 1.3 nm, the mean transport path of electric charge can be adjusted by adjusting the mixing ratio of the charge-transport material relative to the content of the trapping material.

Followings are explanation on other kinds of materials useful in one embodiment of the present invention.

The charge-generating material is designed to generate a carrier when it is irradiated with beam. Examples of this charge-generating material include an inorganic photoconductor such as selenium and alloys thereof, CdS, CdSe, CsSSe, AsSe, ZnO, ZnS and amorphous silicon; various crystalline type ($\alpha$, $\beta$, $\gamma$, $\delta$, $\epsilon$, $\zeta$, $\eta$, $\theta$, $\iota$, $\kappa$, $\lambda$, $\mu$, $\nu$, $\xi$, $o$, $\pi$, $\rho$, $\sigma$, $\tau$, $\upsilon$, $\phi$, $\chi$, $\psi$, $\omega$, A, B, C, X, Y) metal phthalocyanine dye such as titanyl phthalocyanine, vanadyl phthalocyanine, and various liquid crystal type non-metal phthalocyanine dye; azo-based dye and pigment such as monoazo dye, bis-azo dye, tris-azo dye and tetrakis-azo dye; perylene-based dye and pigment such as perylic acid anhydride and perylic imide; perynone-based pigment; indigo-based dye and pigment; quinacridone-based pigment; polycyclic quinone-based pigment such as anthraquinone, anthanthrone and dibromoanthrone; cyanine dye; a charge-transporting complex consisting of an electron-accepting substance and an electron-donating substance, such as TTF-TCNQ; a eutectic complex consisting of pyrylium dye or thiapyrylium dye and polycarbonate resin; azulenium salt; fullerene and derivatives thereof such as $C_{60}$ and $C_{70}$; terephthalic acid derivatives having carbonyl group such as dimethyl terephthalate and diethyl terephthalate; xanthene-based dye and pigment; azulenium dye; and squalylium dye.

These charge-generating materials may be employed singly or in combination of two or more kinds thereof. As described above, two kinds of charge-generating materials which are capable of generating electric charges differing in polarity, and which can be excited respectively by a different wavelength of beam may be dispersed in the recording layer. In this case, one of these charge-generating materials is employed for erasing.

These charge-generating materials can be incorporated into the recording layer, preferably, at a ratio of 0.001 to 40% by weight based on the entire weight of the recording layer. If the content of the charge-generating material is less than 0.001% by weight, the ratio of electric charge to be generated per unit volume by the irradiation of beam would become too small, thereby making it difficult to generate a sufficient magnitude of space charge field. On the other hand, if the content of the charge-generating material exceeds over 40% by weight, the absorption of beam by the charge-generating material would become too large, thus preventing the beam from penetrating into the recording layer, thereby making it difficult to manufacture an optical recording medium having a large film thickness.

As for the charge-transport material, any kinds of material can be employed as long as it is capable of transporting electric charge by hopping conduction. For example, it is possible to employ π-conjugate type polymer or oligomer such as polyacetylene, polypyrrole, polythiophene and polyaniline; σ-conjugate type polymer or oligomer such as polysilane and polygermane; a polycyclic aromatic compound such as anthracene, pyrene, phenanthrene and coronene; a nitrogen-containing cyclic compound or a compound having such a cyclic structure at the main chain or side chain thereof such as indole, carbazole, oxazole, isooxazole, thiazole, imidazole, pyrazole, oxadiazole, pyrazoline, thiadiazole and triazole; a hydrazone compound; aniline and the derivatives thereof; triphenyl amine; triphenyl methane; butadiene; stilbene; TCNQ; anthraquinone; and diphenoquinone.

Specific examples of these compounds are compounds represented by the following chemical formulas (5a) to (5c), a low molecular compound such as triphenyl amine, chloroanyl, bromoanyl, tetracyanoethylene, tetracyanoquinodimethene, 2,4,7-trinitro-9-fluorenone, 2,4,5,7-tetranitro-9-tetrafluorenone, 2,4,7-trinitro-9-dicyanomethylenefluorenone, 2,4,5,7-tetranitro-xanthone, 2,4,9-trinitrothioxanthone, N,N-bis(3,5-dimethylphenyl)-3, 4,9,10-perylenetetracarboxy imide, diphenone, and stilbenzoquinone, and a polymer having any of these compounds at the main chain or side chain thereof.

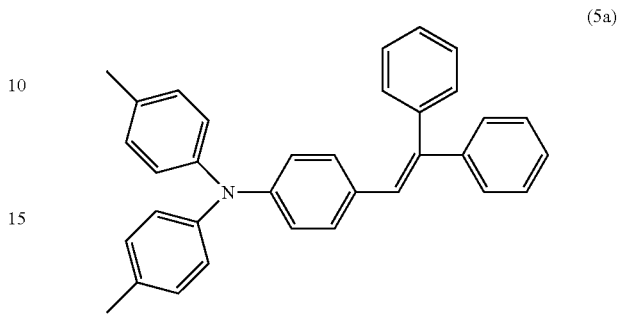

(5a)

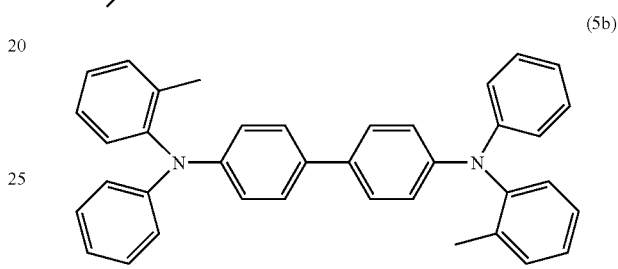

(5b)

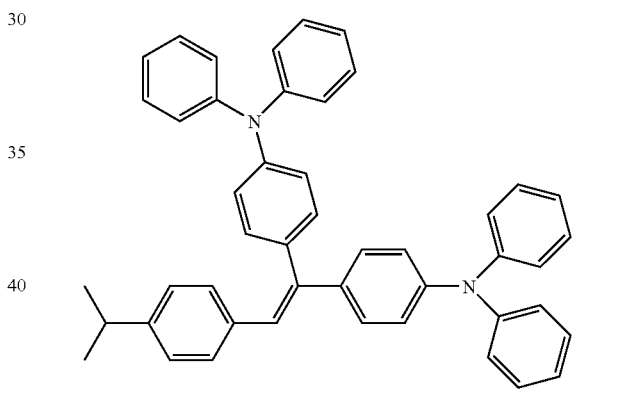

(5c)

As for the charge-transport material for transporting hole in particular, it is preferable, in view of excellent charge-transporting property, to employ the compounds represented by the aforementioned chemical formulas (5a) to (5c), or a compound which is slightly modified for facilitating the dissolution thereof in a polymer. The employment of these compounds is preferable especially when $C_{70}$ is employed as a charge-generating material because of its high charge-generating efficiency.

A polymer represented by the following general formula (8) can be also employed as a charge-transport material.

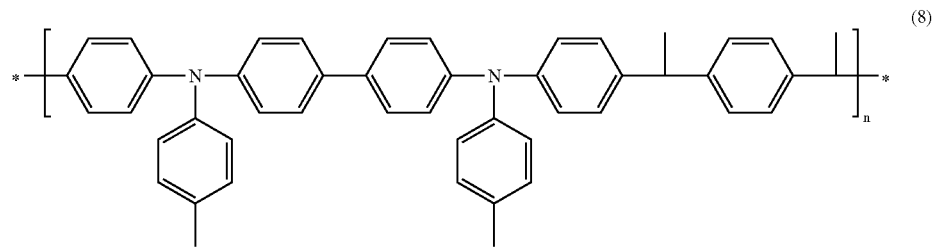

(8)

The polymer represented by the general formula (8) is provided, at the main chain thereof, with a group having a charge-transporting property, so that the polymer is enabled to exhibit an excellent charge-transporting characteristics. Therefore, when this polymer is employed in combination with a trapping material according to one embodiment of the present invention, it is possible to shorten the recording time.

These charge-transport materials can be incorporated into the recording layer, preferably, at a ratio of 0.01 to 70% by weight based on the entire weight of the recording layer. The optically generated electric charge is preferably transported by hopping from a charge-generating material to a charge-transport material, and from one of the charge-transport materials to another one, thus enabling it to be ultimately captured by the trapping material, thereby generating a space charge field. Therefore, if the content of the charge-transport material is less than 0.01% by weight, the electric charge would be deactivated in the charge-generating material without being introduced into the charge-transport material, thereby making it difficult to generate a sufficient magnitude of space charge field. On the other hand, if the content of the charge-transport material exceeds over 70% by weight, it would give rise to the aggregation and crystallization among the charge-transport material, thereby making it difficult to form a device wherein different kinds of molecules are sufficiently dispersed therein.

Further, when a charge-transport material which is capable of exhibiting an absorption characteristic at the wavelength of irradiated beam is employed, electric charge is permitted to be generated by the irradiation of beam, thereby enabling the charge-transport material to function also as a charge-generating material in this case.

By the way, when it is desired to generate two kinds of electric charges differing in polarity in the optical recording medium, suitable kinds of charge-transport materials for transporting these two kinds of electric charges can be employed. In this case, one of the charge-transport materials functions as a charge-transport material for erasing.

As for the non-linear optical material, it is possible to employ, for instance, 1) a substance which is capable of changing the absorption coefficient or refractive index thereof due to Franz-Keldysh effect; 2) a substance which is capable of changing the absorption coefficient, refractive index or luminous efficiency thereof due to exciton effect; 3) a substance which is capable of changing the refractive index thereof due to Pockels effect; and 4) a substance which is capable of changing the optical characteristics of the excitation state thereof and also capable of prolonging the life of the excitation state thereof due to an electric field.

More specifically, it is possible to employ the following compounds. Namely, it is possible to employ spirobenzofuran type molecule, fulgide molecule, cyclofen molecular, diaryl ethene type molecule, azobenzene type molecule, a molecule which is capable of exhibiting photochromism such as polryacrylate or polysiloxane each having cyanobiphenyl group wherein a photochromic molecule is included in a polymer liquid crystal, or polysiloxane containing spirobenzofuran group; and a material which is capable exhibiting a liquid crystal such as p-azoxy ethyl benzoate, ammonium oleate, and p-azoxy anyl.

Additionally, it is also possible to employ urea and derivatives thereof; thiourea and derivatives thereof; nitrobenzene; carbonyl benzene; π-conjugated benzene derivatives such as benzene sulfonate; pyridine N-oxide; pyridine derivatives such as nitropyridine; π-conjugate type polymer or oligomer such as polyacetylene, polypyrrole, polythiophene and polyaniline; σ-conjugate type polymer or oligomer such as polysilane and polygermane; a polycyclic aromatic compound such as anthracene, pyrene, phenanthrene and coronene; a nitrogen-containing cyclic compound or a compound having such a cyclic structure at the main chain or side chain thereof such as indole, carbazole, oxazole, isooxazole, thiazole, imidazole, pyrazole, oxadiazole, pyrazoline, thiadiazole and triazole; a hydrazone compound; triphenyl amine; triphenyl methane; benzene amine; butadiene; stilbene; orphene; imine; piperonal; TCNQ; anthraquinone; diphenoquinone; and fullerene and derivatives thereof such as $C_{60}$ and $C_{70}$.

Furthermore, it is also possible to employ an inorganic photoconductor such as selenium and alloys thereof, CdS, CdSe, AsSe, ZnO, and amorphous silicon; a phthalocyanine dye and pigment such as metal phthalocyanine and non-metal phthalocyanine dye; azo-based dye such as monoazo dye, bis-azo dye, tris-azo dye and tetrakis-azo dye; perylene-based dye and pigment; indigo-based dye and pigment; quinacridone-based dye and pigment; polycyclic quinone-based pigment such as anthraquinone and anthanthrone; cyanine dye; a charge-transporting complex consisting of an electron-accepting substance and an electron-donating substance, such as TTF-TCNQ; a eutectic complex consisting of pyrylium dye and polycarbonate resin; and azulenium salt.

These non-linear optical materials may be employed singly or in combination of two or more kinds thereof. These non-linear optical materials can be incorporated into the recording layer, preferably, at a ratio of 0.01 to 80% by weight based on the entire weight of the recording layer. If the content of the non-linear optical material is less than 0.01% by weight, it would become difficult to expect a sufficient magnitude of change in the optical characteristics thereof. On the other hand, if the content of the non-linear optical material exceeds over 80% by weight, it would give rise to the aggregation and crystallization among the non-linear optical materials, thereby making it difficult to form a device wherein different kinds of molecules are sufficiently dispersed therein.

The charge-generating material, the charge-transport material, the trapping material, and optionally, the non-linear optical material can be suitably combined together so as to obtain a desired mean free path. Further, it is also possible to employ a compound whose molecule is capable of exhibiting two or more functions. In that case, the compound can be incorporated without being restricted by the aforementioned mixing ratio thereof (i.e. weight %). Examples of such a compound include the polymers represented by the following chemical formula (P1).

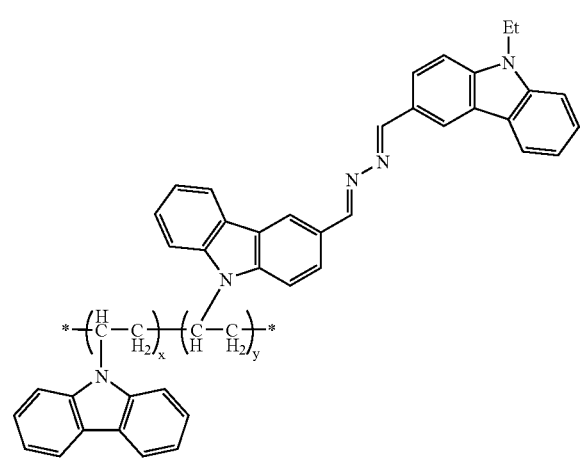

(p1)

In this polymer represented by the chemical formula (P1), the main chain thereof is constituted by two kinds of units. A first unit is provided, at a side chain thereof, with carbazole group which is good in charge-transporting property, whereas a second unit is provided, at a side chain thereof, with a group wherein a couple of carbazole groups are coupled with each other through a conjugated system. This second unit exhibits a high charge retentivity. Namely, in the polymer represented by the chemical formula (P1), the group (trapping material) represented by the aforementioned general formula (B') is introduced into a side chain of the compound. The ratio between the first unit and the second unit (y/x) should desirably be adjusted so as to obtain a desired mean free path. For example, the ratio (y/x) may be confined within the range of 0.001 to 0.5. When the ratio (y/x) is confined within the range of 0.1 to 5, the mean free path can be further reduced. Therefore, it is possible to manufacture an optical recording medium without necessitating the employment of the aforementioned non-linear optical material.

The group represented by the aforementioned general formula (A') may be introduced as a side chain into the main chain of the polymer. Further, the compound represented by the aforementioned general formula (C) may be introduced, via $R^c$ or $R^d$, into the main chain of the polymer.

When the trapping material is introduced as a side chain into the polymer in this manner, the aggregation of the trapping material can be prevented. Therefore, the trapping material can be added at a high concentration to the polymer. Further, when the trapping material is introduced as a side chain into the polymer, it become possible to obtain a large magnitude of free volume, thus advantageously facilitating the generation of changes in geometry thereof on the occasion when electric charge is retained by the trapping material.

By the way, when these components such as the charge-transport material are not constituted by a polymer, a polymer can be mixed with these components. The polymer useful in this case should preferably be optically inactive and be minimal in scattering of molecular weight. However, there is not any particular limitation with respect to the features of the polymer. Examples of the polymer useful in this case include polyethylene resin, nylon resin, polyester resin, polycarbonate resin, polyarylate resin, butyral resin, polystyrene resin, styrene-butadiene copolymer, polyvinyl acetal resin, diallyl phthalate resin, silicone resin, polysulfone resin, acrylic resin, polyvinyl acetate, polyolefin oxide resin, alkyd resin, styrene-maleic anhydride copolymer, phenol resin, vinyl chloride-vinyl acetate copolymer, polyester carbonate, polyvinyl chloride, polyvinyl acetal, polyallylate and paraffin wax. These resins can be employed singly or in combination of two or more kinds.

In order to lower the glass transition point of the recording layer, a plasticizer, i.e. a molecule of relatively small molecular weight can be dispersed in the recording layer. When the glass transition point of the recording layer is lowered in this manner, the geometry of the trapping material can be more easily changed.

Further, compounds which are generally known as useful as a polymeric anti-oxidant or as an ultraviolet absorbent may be employed together with the aforementioned components. Examples of such a compound include hindered phenol, aromatic amine, organosulfur compound, phosphite, chelating agent, benzophenone, benzotriazole, and nickel complex. The mixing ratio of these components should preferably be within the range of 0.0001 to 5% by weight.

The recording layer of the optical recording medium according to one embodiment of the present invention can be formed by a process wherein a composition comprising the aforementioned components is dissolved in a solvent to obtain a solution, which is then deposited on a substrate. As for the solvent useful in this case, it is possible to employ various kinds of organic solvent. For example, it is possible to employ alcohol, ketone, amide, sulfoxide, ether, ester, halogenated aromatic hydrocarbon, and aromatic hydrocarbon.

The recording layer can be formed by using various methods such as a spin-coating method, a dipping method, a roller coating method, a spray coating method, a wire bar coating method, a blade coating method, and a roller coating method; a casting method; a vacuum deposition method; and a sputtering method. Further, a plasma CVD method using glow discharge may be employed for forming the recording layer. If a casting method is to be employed, the method may be performed in such a manner that a solution is cast at first, and after the solvent is permitted to evaporate, the residual powder-like material is thermally fused to form a recording layer.

The thickness of the recording layer thus formed may be generally in the range of 0.05 to 10 mm, more preferably 0.5 to 1 mm. By the way, the thickness of the recording layer can be suitably selected by taking into account the characteristics needed for the optical recording layer such as the recording capacity, transmittance, etc. and also taking into account the composition of the recording layer.

A solution containing a composition comprising the aforementioned components is coated on a suitable substrate to form a recording layer. The substrate useful in this case can be selected from those having a suitable thickness, a suitable hardness and a sufficient strength for the convenience of handling.

This substrate can be used not only for forming the recording layer but also as a substrate of the optical recording medium. Namely, the optical recording medium according to one embodiment of the present invention can be constituted by a substrate and a recording layer formed on this substrate. The substrate to be used in this case should preferably be transparent at least to some extent at a wavelength range of beam to be employed. By the way, the wavelength of beam is, for example, 780 nm, 650 nm or 405 nm if a semiconductor laser is to be employed. In the case of the ordinary resins, they are transparent to a light having a wavelength ranging from 400 nm to 600 nm or a visible zone, and many of the resins are also transparent to a light having a wavelength up to 800 nm or a long wavelength zone. Therefore, polyvinyl chloride, polyvinylidene chloride, polyethylene, polycarbonate, polyester, polyamide, acrylic resin and polyimide can be preferably employed.

These materials for the substrate may be employed as a flat sheet or as a cylindrical sheet if desired. If these materials are employed as a cylindrical sheet, the substrate should have a suitable degree of flexibility.

The recording layer disposed on the substrate may be provided, on the surface thereof, with an electrode layer if desired. As for the material for constituting the electrode layer, it should be transparent to some degree, just like the substrate, in the wavelength range of light to be employed. Therefore, indium tin oxide or aluminum can be preferably employed. The sheet resistance of the electrode should preferably be 50 $\Omega cm^{-2}$ or less.

If desired, the recording layer may be covered with a protective layer. As for the materials for this protective layer, it may be optionally selected. For example, it is possible to employ a thermosetting resin such as acrylic resin, fluororesin, silicone resin and melamine resin; a photocurable resin, an EB curable resin, an X-ray curable resin and a UV curable resin.

An additive such as anti-oxidant, an ultraviolet absorbent and an anti-aging agent may be incorporated, at a small amount, in this protective layer. Examples of such an additive include hindered phenol, aromatic amine, organosulfur compound, phosphite, chelating agent, benzophenone, benzotriazole, and nickel complex.

When a non-linear optical material is incorporated into the recording layer, the recording layer may be subjected in advance to a poling treatment. In this poling treatment, the recording layer is heated up to near the glass transition point thereof and an external electric field is applied to the recording layer. By doing so, molecules which are relatively large in permanent dipole moment, in particular, the non-linear optical material are aligned in the direction of the external electric field, thereby enhancing the non-linearity thereof to the beam.

Next, the procedures for using the aforementioned optical recording medium as a hologram memory, more specifically, the methods of recording information in the medium and of reading the recorded information will be explained.

Figure 5:
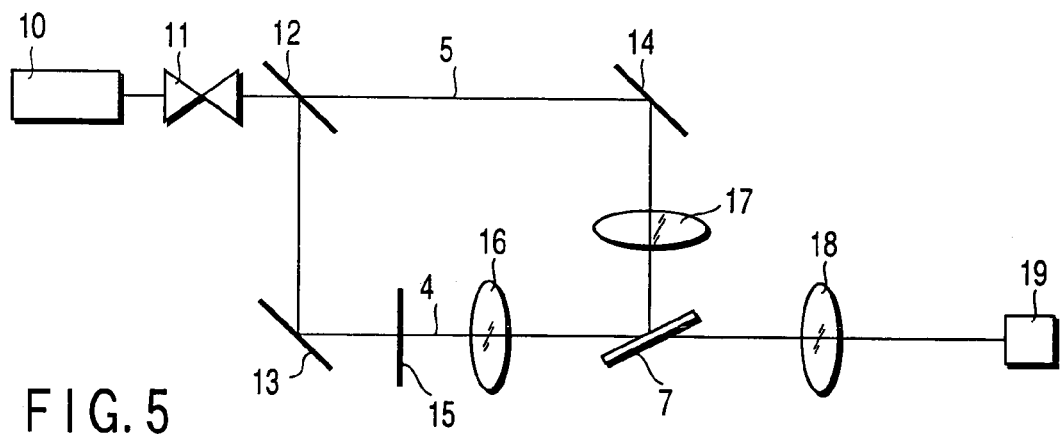
FIG. 5 shows a diagram illustrating the construction of an apparatus for recording hologram in an optical recording medium according to one example of the present invention.

FIG. 5 shows one example of the recording apparatus for recording information in the optical recording medium according to one embodiment of the present invention.

As shown in FIG. 5, an optical recording medium 7 shaped into a rectangular parallelepiped is prepared at first. Then, an image display element 15 is disposed on one side of the optical recording medium 7, and a reading device 19 is disposed on the opposite side of the optical recording medium 7. It is desirable that this reading device 19 is disposed perpendicular to the axis of beam to be irradiated from an image display element 15 onto the optical recording medium 7. As for this image display element 15, various kinds of device such as a liquid crystal, a digital mirror array, a Pockels readout optical modulator, a multi-channel spatial modulator, a Si-PLZT element, a deformed surface type element, an AO or EO modulating element and a magneto-optical effect element can be employed. As for the reading device 19, any kind of photoelectric converting device can be employed. For example, it is possible to employ a CCD, a CMOS sensor, a photodiode, a photoreceptor and a photomultiplyer tube.

Although the beam is assumed to pass through the image display element 15, this image display element 15 may be constituted by an element which is designed to reflect the beam.

The recording of information to the optical recording medium can be performed according to the following procedures. As for the light source for the recording, it is required to be a coherent light which is represented by a laser. Therefore, an embodiment where a laser is employed will be explained herein. The wavelength of the laser can be selected depending on the components of the optical recording medium to be employed. More specifically, the wavelength of the laser can be selected according to the charge-generating material. In the case where the optical recording medium in which the phenomenon changing the optical characteristics when the trapping material retains charge is used, the wavelength is selected corresponding to the trapping material. As for the laser 10, any kind of conventional laser, such as gas laser, liquid laser, solid laser, or semiconductor laser can be employed. The output emitted from the laser 10 is split into two by using a beam splitter 12 for instance. Namely, one of them is employed as a reference beam 5, and the other is employed as a signal beam 4, thus enabling it pass through the image display element 15.

In the recording procedures of information using this apparatus, the signal beam 4 and the reference beam 5 are irradiated onto the optical recording medium 7 so as to enable these beams to intersect with each other in the recording layer. Specifically, this can be achieved by the following procedures. Namely, the beam emitted from the laser 10 is expanded to a parallel beam by a beam expander 11, and then, split into two by using a beam splitter 12 for instance. The information to be recorded is digitized in advance, and the image pattern corresponding to this digitized information is input in advance into the image display element 15. One of the beam that has been split by the beam splitter 12 is irradiated, via the mirror 13, onto the image display element 15 so as to spatially modulate its intensity distribution for instance in accordance with data for recording, thereby making it the signal beam 4. Further, this signal beam 4 is converged by the lens 16 and irradiated onto the optical recording medium 7. If the focal distance of the lens 16 is defined as f1, the distance between the image display element 15 and the lens 16 should preferably be adjusted identical with this f1. Concurrently, the reference beam 5 is irradiated onto the optical recording medium 7 so as to enable the reference beam 5 to intersect with the signal beam 4. By the way, the reference beam 5 is reflected with a mirror 14 and then converged in advance by the lens 17.

Due to the interference fringes that has been generated by the overlapping of the signal beam 4 with the reference beam 5, a space charge field is caused to generate. As a result, the modulation of optical characteristics is caused to occur in the recording layer, thus forming a diffraction grating. On this occasion, by changing the incident angle of the reference beam and/or the incident angle of the signal beam, a plurality of interference fringes can be formed in the overlapping region. Alternatively, by rotating the optical recording medium 7 relative to the direction of incident beam, the incident angles of the reference beam and the signal beam can be varied. Furthermore, when the position to which the laser beam is irradiated is displaced by a magnitude of ½ to ¹⁄₁₀₀₀ of the overlapping region of the signal beam and reference beam, a plurality of interference fringes can be formed in the overlapping region of two beams.

On the occasion of reading the information that has bee recorded, the signal beam 4 was shut off, and only the reference beam 5 is irradiated onto the optical recording medium 7. Namely, the reference beam 5 can be employed also as reading beam. On this occasion, a reading beam having the same spatial intensity distribution as that of the signal beam 4 can be reconstructed due to the interference fringes that have been recorded. Therefore, after being permitted to pass through the lens 18, this reconstructed beam is read out by the reading device 19. From the intensity distribution of the beam read out in this manner, reading recorded information can be realized. If the focal distance of the lens 18 is defined as f2, the distance between the lens 16 and the lens 18 should preferably be made equal to f1+f2, and the distance between the lens 18 and the reading device 19 should preferably be made equal to f2. The recording apparatus according to one embodiment of the present invention may be provided with a detector detecting a beam to reproduce the information that has been recorded as the interference fringes, such as the reading device 19. The recording apparatus according to one embodiment of the present invention may be applied to a reading apparatus only to reproduce the information that has been recorded as the interference fringes in the above optical recording medium comprising the above trapping material, when it is provided with a detector such as the reading device 19.

In this embodiment, the wavelength of the light source employed in the reading is the same as that employed in the recording. However, it is also possible to employ a light source of different wavelength. Namely, when the thickness of recording layer is not more than 0.5 mm, even if a light source of slightly different wavelength from that employed in the recording is employed in the reading, the reading of the recorded information can be realized. In that case, the angle of the reading beam may be slightly altered from that of the recording beam so as to enhance the intensity of the diffraction beam. Even in this case, the reading device 19 should preferably be disposed perpendicular to the axis of the reconstructed beam.

In this embodiment, the reference beam 5 is also converged by the lens 17. However, the reference beam may not necessarily be converged. Namely, the lens 17 may be omitted by interposing the beam expander 11 at any location between the laser 10 and the image display element 15.

Figure 6:
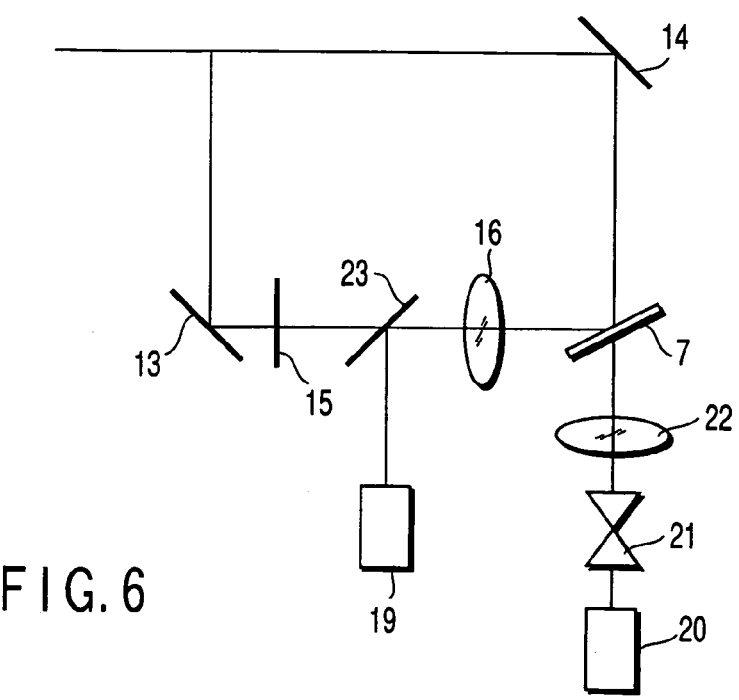
FIG. 6 is a diagram illustrating the construction of an apparatus for reading hologram that has been recorded in an optical recording medium according to one example of the present invention.

It is also possible to perform phase conjugated reading on the occasion of reading the recorded information. The process thereof will be explained with reference to FIG. 6. In FIG. 6, the coherent beam of the same wavelength as that employed in the recording is irradiated in the opposite direction to that employed in the recording.

Namely, the beam emitted from the laser 20 which is designed to emit the same wavelength as that employed in the recording is permitted to expand in diameter by the beam expander 21 for instance, and then, irradiated, by using the lens 22, onto the optical recording medium 7 from the direction which is quite opposite from that when the reference beam was irradiated thereto. As a result, by the diffraction grating that has been recorded in the optical recording medium 7, a virtual image which is opposite in direction from that forwarded by the signal beam 4 will be reconstructed. After being passed through the lens 16, the virtual image is permitted to reflect by the beam splitter 23 so as to be read by the reading device 19. In the same manner as on the occasion of recording, the distance between the lens 16 and the reading device 19 should preferably be made equal to the focal distance of the lens 16. It is also possible in this phase conjugated reading to employ a coherent beam having a slightly different wavelength from that employed in the recording. In that case, the incident angle of the reading beam should preferably be slightly adjusted so as to make the beam axis of the virtual image completely align with the axis of signal beam 4.

If the reference beam 5 is not converged on the occasion of recording, it is possible to omit the beam splitter 21 and the lens 22 even in this phase conjugated reading.

The information recorded in the optical recording medium may be erased if desired. For example, by irradiating a beam having a uniform intensity distribution all over a larger region as compared with the recording region, or by heating the optical recording medium up to a temperature lower than the glass transition temperature thereof, the recorded information can be erased. Alternatively, the recorded information can be erased by uniformly irradiating a beam having a wavelength against which the trapping material is incapable of absorbing if it is in the neutral state but is capable of absorbing if it is in the ionized state.

The methods of recording and reading information in the optical recording medium according to one embodiment of the present invention are not confined to the aforementioned examples but can be variously modified. For example, the signal beam 4 and the reference beam 5 may be introduced into the optical recording medium 7 from the different side thereof, respectively.

If the information is recorded as a digital data, a plurality of pixels of the image display element 15 may be represented as a single data.

If the information is to be supplied by the intensity distribution of signal beam, the intensity of beam at the bright portion and at the dark portion may not be uniform throughout the diameter of beam. Namely, the transmittance of beam in the image display element may be lowered at the central portion thereof and enhanced at the marginal portion. It is possible in this manner to preliminarily correct the phenomenon that the reconstructed beam is weakened at the marginal region as compared with the central region. Alternatively, a beam intensity modulating element having a higher absorption coefficient at the central region and a lower absorption coefficient at the marginal region may be disposed in front of the reading device 19 so as to obtain the same effect as mentioned above.

Next, the method of recording information in a plurality layers of the recording medium and the method of reading information therefrom in the multi-layer optical recording medium according to one embodiment of the present invention will be explained with reference to FIG. 7.

The beam emitted from a semiconductor laser 31 is turned into a parallel beam by a collimator lens 32, and then, converged in the recording layer by using an objective lens 33. By increasing the injection current to the semiconductor laser 31 for a suitable period of time on the occasion of irradiating laser beam, the information can be recorded as a change in optical constant at only the vicinity of focal point. By locating the position of focal point at a desired portion within the medium, the information can be recorded as the region 34 where the optical constant is altered, which can be distinguished from the region where the optical constant is not altered.

The information thus recorded can be read by a process wherein an iris 35 is disposed on the axis of beam and the intensity of beam that has passed through the iris 35 is measured by a beam detector 36. Namely, the reading beam is irradiated so as to enable the axis of reading beam to pass through the region where the optical constant is altered, and the focal point is scanned in the depth-wise of the recording layer. As a result, the intensity I of transmitted beam to be observed can be expressed as a function of the focus position Z in the direction of depth (herein, the center of the region where the optical constant was altered is defined as Z=0) as shown in FIG. 8. The reason for this can be attributed to the fact that the refractive index of the medium is altered in the vicinity around Z=0, thereby generating the lens effect. Even if the region where the optical constant is not altered is scanned, the intensity of transmitted beam would not be changed. Therefore, by determining if there is a change in intensity of the transmitted beam, it become possible to determine the region where the optical constant is altered. Therefore, if the region to be recorded has been determined in advance, it is possible to read the recorded information by knowing the fluctuation of intensity of transmitted beam in the vicinity of that predetermined region.

However, in order to prevent the optical characteristics from being newly altered on the occasion of reading information, the injection current should preferably be controlled so as to confine the intensity of reading beam to about $1/2$ to $1/100$ of the recording beam.

Alternatively, as a more simple reading method, the recorded data on the recorded position may be read by detecting the intensity of the transmitted beam in the vicinity of the recorded position. Namely, the recorded information can be read by detecting the intensity of the transmitted beam of the position which is displaced in depth-wise by a distance $Z_0$ (shown in FIG. 8) from the data-recorded position. When the focal point of reading beam is existed at the position which is displaced in depth-wise by the distance $Z_0$ from the region where the information is not recorded, the intensity of the transmitted beam would indicate a value $I_0$, whereas when the focal point of reading beam is existed at the position which is displaced in depth-wise by the distance $Z_0$ from the region where the information is recorded, the intensity of the transmitted beam would be $I_0+\Delta I$, so that, by detecting this intensity of the transmitted beam, the recorded information existing at the position which is displaced by the distance $Z_0$ from the focal point of the reading beam can be read.

In the case where the film thickness is sufficiently large or where the glass plate is disposed on the objective lens side of the recording layer, a lens which is long in operating distance such as CF IC LCD Plan CR (tradename, NIKON Co., Ltd.; magnification: 100 times) can be preferably employed as an objective lens. Further, in the case where the substrate is disposed at the top and bottom surfaces of the recording layer, the thickness of the substrate to be disposed on the objective lens side should preferably be 0.5 mm or less. Alternatively, the substrate may not be disposed on the objective lens side of the recording layer. In that case, the recording layer may be housed inside a diskette in order to prevent the recording layer from being scratched.

The method of recording information to the optical recording medium according to one embodiment of the present invention as well as the method of reading the information therefrom are not limited to the aforementioned examples, but may be variously modified. For example, reading information may be performed in the same manner as in the case of a confocal microscope. Alternatively, a reflector may be provided on the side of optical recording medium which is opposite to where the objective lens is disposed, thereby making it possible to read information by using a reflected beam.

The optical recording medium according to the present invention is not limited to the aforementioned embodiments, but may be varied within the spirit of the invention. For example, if the recording layer of the optical recording medium has a sufficient strength, it may be employed singly without supplementing it with a supporting plate.

The optical recording medium according to one embodiment of the present invention is constructed such that the recording layer thereof contains a conjugated system and at least one nitrogen-containing heterocyclic compound, and that this nitrogen-containing heterocyclic compound is coupled, through an unsaturated carbon atom, with the conjugated system. Therefore, the optical recording medium of one embodiment of the present invention is advantageous in that the response speed thereof is faster and the recording time is shorter as compared with the conventional optical recording medium.

First of all, the features of the trapping material according to one embodiment of the present invention will be explained in comparison with the conventional trapping material.

FIG. 9 shows the absorption spectra of the compound represented by the following chemical formula (16) and the compound represented by the following chemical formula (51). In FIG. 9, the curve "c" denotes the absorption spectrum of the compound represented by the chemical formula (16), and the curve "d" denotes the absorption spectrum of the compound represented by the chemical formula (51).

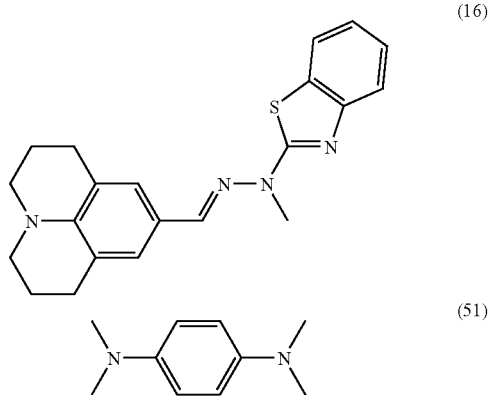

The compound represented by the chemical formula (16) is a trapping material according to one embodiment of the present invention, whereas the compound represented by the chemical formula (51) is a trapping material set forth in the publication: "Photoreflective polymers with low intrinsic trap density", H. J. Bolink, V. V. Krasnikov, and G. Hadziioannou, Proc. SPIE, Vol. 3144, p.p. 124-133 (1997).

As clearly shown in FIG. 9, the compound represented by the chemical formula (51) (curve "d") shows a stronger absorption in the 500-700 nm wavelength range as compared with the compound represented by the chemical formula (16) (curve "c"). Therefore, if a light source of 633 nm or 532 nm is to be employed as a light source for the recording beam, it would give rise to the defect that, when the thickness of the recording layer of optical recording medium is enlarged, the intensity of diffracted beam is caused to decrease due to the absorption of the trapping material. Even in the case of the compound wherein an electron-donating group having a heterocyclic structure is coupled, through a conjugated system, with an electron-accepting group, it frequently exhibits a strong absorption at the visible range (for example, "Effect of the chromophore donor group and ferrocene doping on the dynamic range, gain, and phase shift in photorefractive polymer", E. Hendrickx, D. V. Steenwinckel, A. Persoons, C. Samyn, D. Beljonne, and J-L. Bredas, J. Chem. Phys. vol. 113, p.p. 5439-5447 (2000).

Next, the charge retentivity of the compound represented by the aforementioned chemical formula (16) and of the compound represented by the following chemical formula (52) was measured by the Xerographic method.

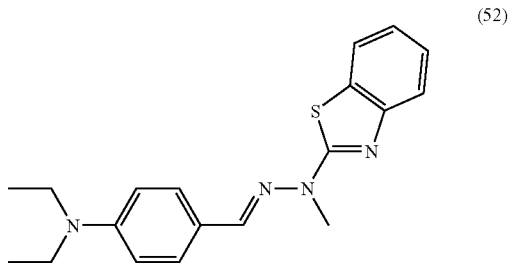

The compound represented by the chemical formula (52) is the same in structure as that of the compound represented by the chemical formula (16) excepting that the nitrogen-containing heterocyclic group is not coupled with the conjugated system.

Figure 10:
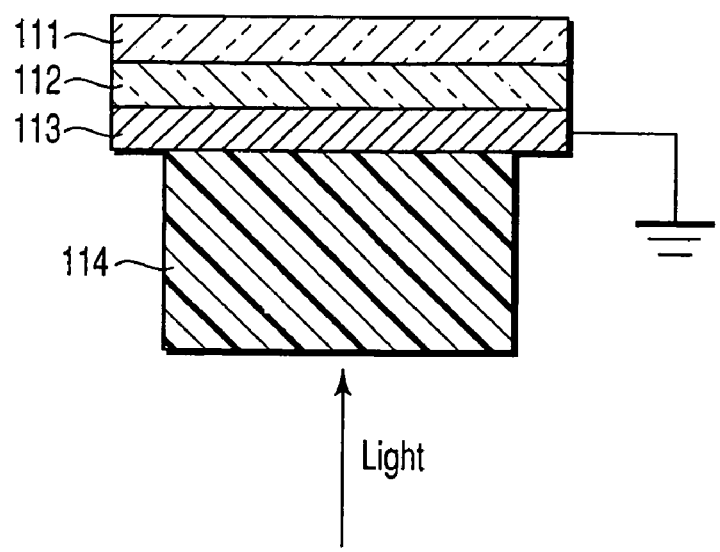
FIG. 10 is a diagram illustrating the method of measuring charge-retaining capability.
Figure 11:
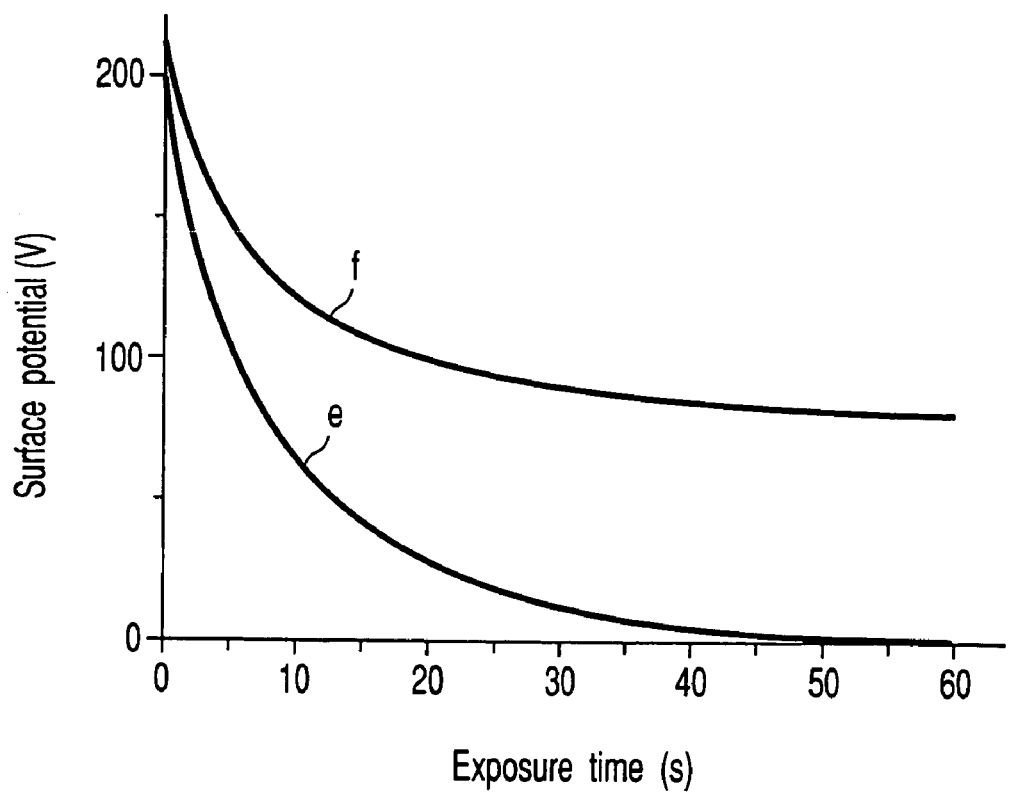
FIG. 11 is a graph illustrating the changes of electric potential at the surface of a sample.

The method of measuring the charge retentivity will be explained with reference to FIG. 10. First of all, a sample is prepared at a suitable mixing ratio. On the other hand, an ITO film 112 and an Al film 113 are successively evaporated on the surface of a glass plate 111. Then, the sample is deposited on the Al film 113 by using a spinner to form a measuring film 114. Thereafter, the surface of the measuring film 114 is positively charged by corona discharge, and then, beam is irradiated to the surface of the measuring film 114. The electric charge generated by the irradiation of beam is then transported to an earthed counter electrode side. If electron is retained by the charge-generating site after electric charge has been generated in the vicinity of the surface of measuring film 114, the electric potential of the surface of sample will be attenuated in proportion to the number of hole that has been transported. More specifically, as indicated by the curve "e" in FIG. 11, the electric potential will be attenuated. On the other hand, if the trapping material for retaining hole is dispersed inside the sample, the transported distance of hole will be shortened as the hole is retained by the trapping material. Therefore, the surface potential would not be attenuated down to zero, but is gradually shifted to a constant value as represented by the curve "f" in FIG. 11. Therefore, the value of surface potential thus shifted would become a hint for knowing the number of trapped hole. On this occasion, the dark attenuation of the surface potential after the finish of irradiation may be considered as being caused by the de-trapping of hole that has been once trapped.

25% by weight of the compound shown in the chemical formula (5b), 69.5% by weight of polystyrene, 0.5% by weight of $C_{70}$, and 5% by weight of a trapping material were dissolved in toluene and tetrahydrofuran to prepare a solution. As for the trapping material, the compounds represented by the aforementioned chemical formulas (16) and (52), and the compound represented by the following chemical formula (53) were individually employed.

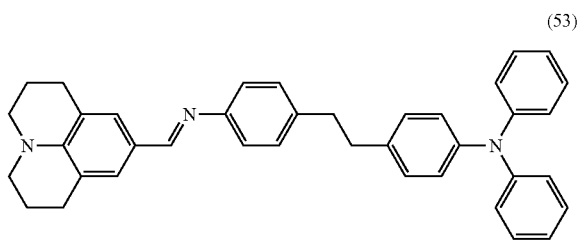

(53)

Then, by using the solution and by a film-forming method using a spinner, samples each having a thickness of about 5 nm were manufactured. These samples were electrified to +200V or so, and then, irradiated with a beam having a wavelength of 500 nm for 60 seconds, the dark attenuation of the surface potential on this occasion is shown in FIG. 12.

Figure 12:
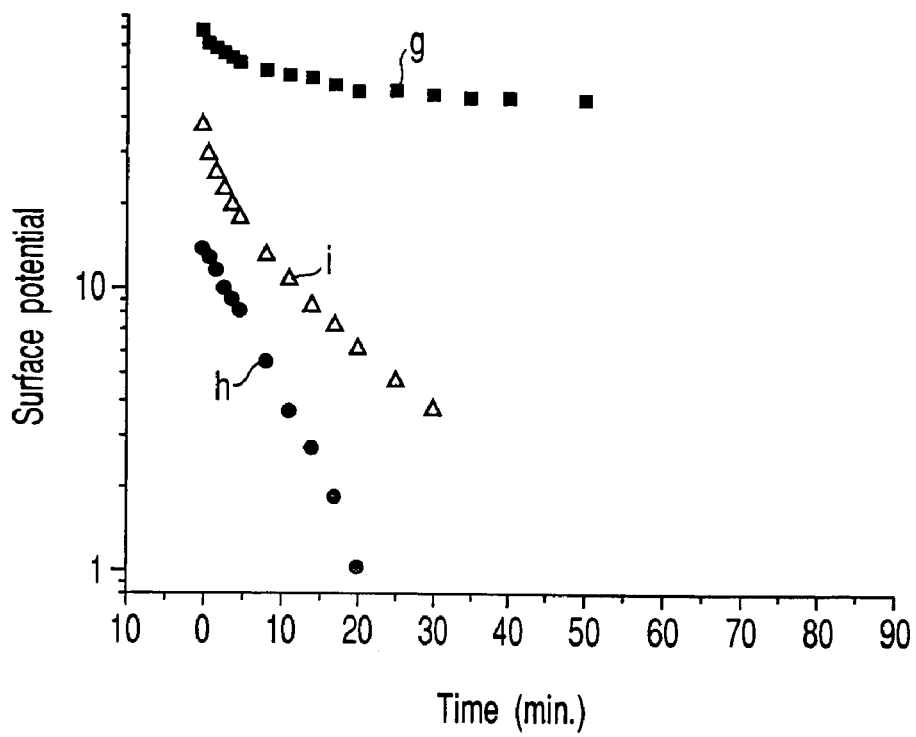
FIG. 12 is a graph illustrating the changes of electric potential at the surface of a sample.

In FIG. 12, the plots g, h and i show the results tested of the samples containing, as a trapping material, the compounds represented by the chemical formulas (16), (52) and (53), respectively.

As shown in FIG. 12, the sample wherein the compound represented by the chemical formula (16) was dispersed therein (plot g) exhibited a lower attenuation of surface potential as compared with that of the sample wherein the compound represented by the chemical formula (52) was dispersed therein (plot h). The compound represented by the chemical formula (16) is featured in that the heterocyclic structure (julolidine group) exhibits a stronger donativity as compared with the compound represented by the chemical formula (52). Therefore, this high charge retentivity of this compound represented by the chemical formula (16) can be easily understood.

Likewise, the compound represented by the chemical formula (16) was compared, with respect to the charge retentivity, with the compound represented by the chemical formula (53). The compound represented by the chemical formula (53) is featured in that a group having a heterocyclic group exhibiting a strong donativity is bonded to triphenyl amine exhibiting high charge transporting ability via non-conjugated bond.

As clearly shown in FIG. 12, the sample wherein the compound represented by the chemical formula (16) was dispersed therein (plot g) exhibited a lower attenuation of surface potential as compared with that of the sample wherein the compound represented by the chemical formula (53) was dispersed therein (plot i).

In the case of the compound represented by the chemical formula (53), a couple of electron-donating groups are coupled with each other not through a conjugated system. Therefore, even if hole is retained in this compound, there is no possibility that the changes in conjugated state or in molecular geometry can be brought about throughout the molecule. Therefore, the compound represented by the chemical formula (53) is lower in charge retentivity as compared with the compound represented by the chemical formula (16).

By the way, if the conjugated system is too long, it would become difficult to expand a conjugated state throughout the molecule even if electric charge is retained therein. If such is the case, it would become difficult to realize a high charge retentivity. Therefore, the conjugated system should preferably be as short as possible.

Next, the present invention will be further explained with reference to the following examples and comparative examples.

EXAMPLE 1

First of all, an optical recording medium was prepared as follows.

0.5% by weight of fullerene ($C_{70}$), 44.5% by weight of poly(N-vinyl carbazole) (PVK) as a transport material, 7.5% by weight of N-ethyl carbazole (EtCz) and 7.5% by weight of Bis-carbazolyl propane (Bis CzPro) as plasticizing agents, 35% by weight of N-[[4-(dimethylamino) phenyl]-methylene]-2-methyl-4-nitrobenzene amine (DBMNA) as a nonlinear optical material, and 5% by weight of a trapping material represented by the following chemical formula (11) were dissolved in a mixture of tetrahydrofuran (THF) and toluene to prepare a co-solvent solution. As shown in the chemical formula, this compound was provided with a couple of carbazole groups both exhibiting electron donativity and being coupled to each other through a conjugated group.

(11)

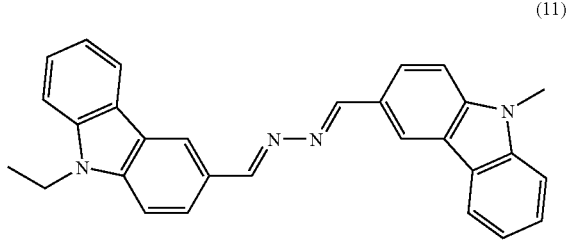

Then, an ITO (Indium Tin Oxide) film was formed on the surface of a glass plate to prepare a substrate. The aforementioned co-solvent solution was then coated on the surface of this substrate by a casting method to form a recording layer. The thickness of this recording layer was adjusted to 50 μm by using a Teflon (registered trademark) spacer. Further, this recording layer was subjected to a poling treatment wherein both electrodes thereof were connected with a power source of 3 kV at a temperature of 80° C. to prepare an optical recording medium.

Figure 13:
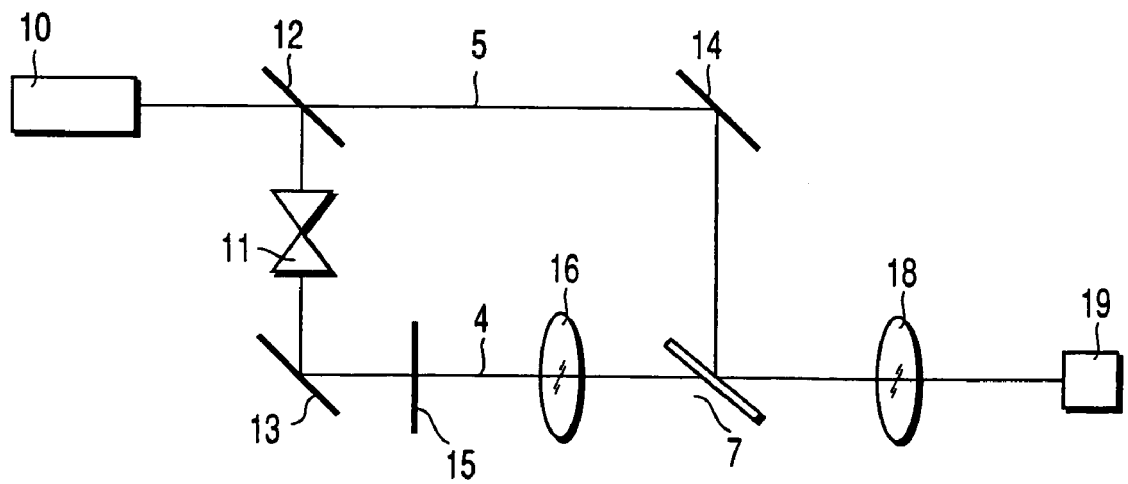
FIG. 13 shows a diagram illustrating the construction of an apparatus for recording hologram in an optical recording medium according to another example of the present invention.

By using a recording apparatus constructed as shown in FIG. 13, the recording and reading hologram were performed as follows. In the operation of this recording apparatus shown in FIG. 13, the beam emitted from a He—Ne laser (output: 30 mW) 10 was at first split into two by a beam splitter 12. One of the beams which was reflected by the beam splitter 12 was passed through a beam expander 11 to expand the diameter of the beam and then, permitted to pass through a liquid crystal filter 15 functioning as an image display element. This liquid crystal filter 15 was designed such that the transmissivity thereof was modulated in advance in conformity with the information to be recorded, and that the transmitted beam was turned into a signal beam 4, which was then converged by a lens 16 (focal length: 150 mm). The distance between the lens 16 and the optical recording medium 7 was set to 135 mm.

On the other hand, the other beam passed through the beam splitter 12 was irradiated as a reference beam 5 onto the optical recording medium 7. On this occasion, the path of the reference beam 5 was adjusted so as to enable the reference beam to cover the converged region of the signal beam 4 within the optical recording medium. When the angles of incidence of the signal beam 4 and the reference beam 5 irradiated onto the surface of the optical recording medium 7 were measured outside the optical recording medium 7, the angles of incidence relative to the normal line of the optical recording medium 7 were found 40 degrees and 50 degrees, respectively.

Since the substrate of the optical recording medium 7 was connected with the external power source (not shown) of 3 kV, an external electric field of 60 V/μm was applied to the recording layer. When the beams were irradiated in this manner onto the optical recording medium 7 for 10 seconds, a hologram was enabled to be recorded in the optical recording medium 7.

Subsequently, the information thus recorded was read as follows. On the occasion of this reading, the path of the signal beam 4 was shut off by a shutter. Then, the beam which had passed through the beam splitter 12 was irradiated, as a reading beam, onto the optical recording medium 7 to generate a reconstructed beam. After permitting this reconstructed beam to pass through a lens 18 (focal length: 150 mm) of the same construction as the lens 16, this reconstructed beam was permitted to enter into a CCD 19 functioning as a reading apparatus. As a result, a reconstructed beam having the same intensity distribution as that of the signal beam 4 was detected. In this case, the lens 18 was disposed perpendicular to the axis of beam and at a position which was spaced 300 mm away from the lens 16 so as to enable the axis of beam to align with the center of the lens 18. The CCD 19 was also disposed perpendicular to the axis of beam. The distance between the lens 18 and the CCD 19 was set equal to the focal length of the lens 18.

The information thus recorded was found possible to be reconstructed even one month later.

EXAMPLE 2

A co-solvent solution was prepared by repeating the same procedures as set forth in Example 1 except that the compound represented by the following chemical formula (12) was employed as a trapping material in place of the trapping material employed in Example 1.

(12)

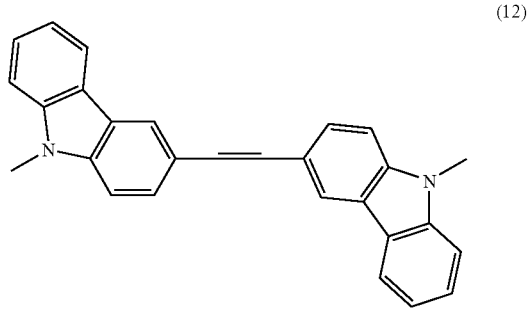

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within 10 seconds. The information thus recorded was found possible to be reconstructed even one month later.

EXAMPLE 3

A co-solvent solution was prepared by repeating the same procedures as set forth in Example 1 except that the compound represented by the following chemical formula (13) was employed as a trapping material in place of the trapping material employed in Example 1.

(13)

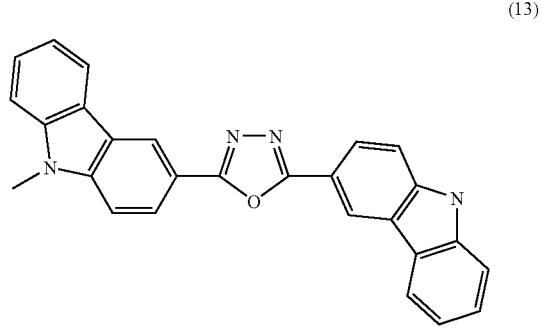

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within 5 seconds. The information thus recorded was found possible to be reconstructed even one month later.

EXAMPLE 4

A co-solvent solution was prepared by repeating the same procedures as set forth in Example 1 except that the compound (7-DCST) represented by the following chemical formula (14) was employed as a non-linear optical material in place of the non-linear optical material employed in Example 1, and the compound represented by the following chemical formula (15) was employed as a trapping material in place of the trapping material employed in Example 1.

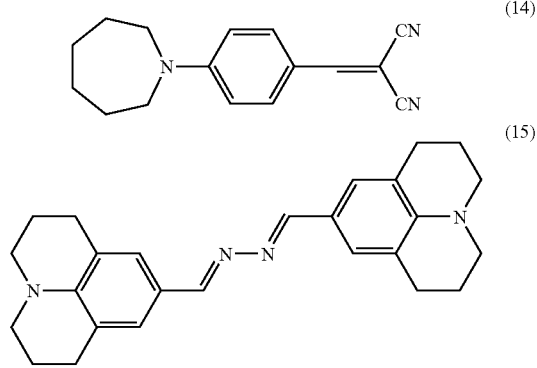

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within one second. The information thus recorded was found possible to be reconstructed even one month later.

EXAMPLE 5

A co-solvent solution was prepared by repeating the same procedures as set forth in Example 4 except that the compound represented by the aforementioned chemical formula (16) was employed as a trapping material in place of the trapping material employed in Example 4.

Then, by the same procedures as set forth in Example 1, the co-solvent solution thus obtained was coated on the surface of substrate to form a recording layer having a thickness of 50 μm. Further, this recording layer was subjected to a poling treatment at a temperature of 100° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within 10 seconds. The information thus recorded was found possible to be reconstructed even one month later.

EXAMPLE 6

0.5% by weight of $C_{70}$, 34.5% by weight of polystyrene (PS), 30% by weight of the compound represented by the aforementioned chemical formula (5b) as a charge-transport material, 30% by weight of the 7-DCST, and 5% by weight of a compound represented by the aforementioned chemical formula (16) as a trapping material were dissolved in a mixture of THF and toluene to prepare a co-solvent solution.

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within one second. The information thus recorded was found possible to be reconstructed even one month later.

EXAMPLE 7

A co-solvent solution was prepared by repeating the same procedures as set forth in Example 6 except that the compound represented by the following chemical formula (17) was employed as a trapping material in place of the trapping material employed in Example 6.

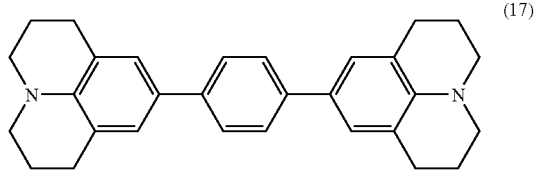

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within one second. The information thus recorded was found possible to be reconstructed even one month later.

EXAMPLE 8

A co-solvent solution was prepared by repeating the same procedures as set forth in Example 6 except that the content of the charge-transport material was changed to 25% by weight, that 5% by weight of triphenyl amine was added as a plasticizing agent, and that the compound represented by the following chemical formula (18) was employed as a trapping material in place of the trapping material employed in Example 6.

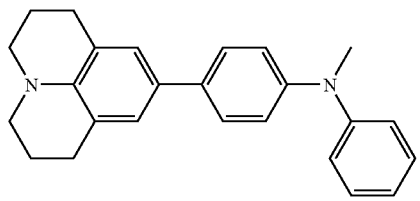

(18)

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within one second. The information thus recorded was found possible to be reconstructed even one month later.

EXAMPLE 9

A co-solvent solution was prepared by repeating the same procedures as set forth in Example 6 except that the compound represented by the following chemical formula (19) was employed as a trapping material in place of the trapping material employed in Example 6.

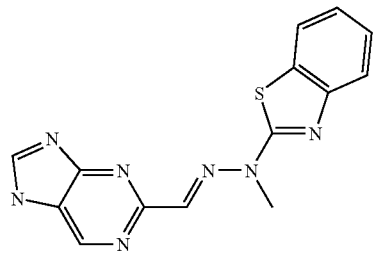

(19)

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within one second. The information thus recorded was found possible to be reconstructed even one month later.

EXAMPLE 10

0.5% by weight of $C_{70}$, 49.5% by weight of the copolymer (y/x=0.05) represented by the aforementioned chemical formula (P1), 7.5% by weight of the EtCz, 7.5% by weight of the Bis CzPro, and 35% by weight of the 7-DCST were dissolved in a mixture of THF and toluene to prepare a co-solvent solution. The copolymer represented by the chemical formula (P1) was capable of functioning as a charge-transport material and also as a trapping material. The content of the copolymer as this trapping material was about 5% by weight.

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was performed under the same conditions as employed in Example 1. As a result, it was found possible to sufficiently achieve the recording within 10 seconds. The information thus recorded was found possible to be reconstructed even one month later.

EXAMPLE 11

0.5% by weight of $C_{70}$, 64.5% by weight of the copolymer (y/x=0.05) represented by the following chemical formula (P2), and 35% by weight of the DBMNA were dissolved in a mixture of THF and toluene to prepare a co-solvent solution. The copolymer represented by the chemical formula (P2) was capable of functioning as a charge-transport material, as a trapping material and also as a non-linear optical material. The content of the copolymer as this trapping material was about 4% by weight.

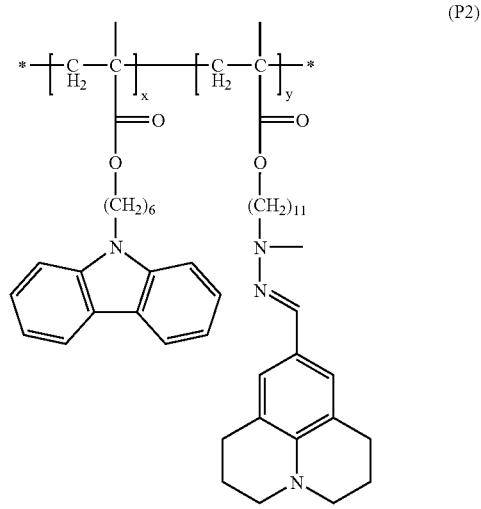

(P2)

The polymer represented by the chemical formula (P2) was provided, at a side chain thereof, with the group represented by the aforementioned general formula (A'). More specifically, the polymer contained, as $R^b$, a nitrogen-containing heterocyclic group.

Then, by the same procedures as set forth in Example 1, the co-solvent solution thus obtained was coated on the surface of substrate to form a recording layer having a thickness of 50 μm, thus manufacturing an optical recording medium.

By using the optical recording medium thus obtained, the recording of information was performed under the same conditions as employed in Example 1. As a result, it was found possible to sufficiently achieve the recording within 10 seconds. The information thus recorded was found possible to be reconstructed even one month later.

EXAMPLE 12

A co-solvent solution was prepared by repeating the same procedures as set forth in Example 1 except that the compound represented by the following chemical formula (20) was employed as a trapping material in place of the trapping material employed in Example 1.

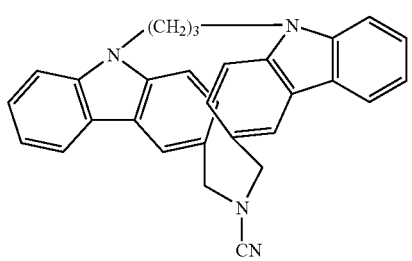

(20)

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

The compound represented by the chemical formula (20) and employed as a trapping material includes in its molecule a couple of carbazole groups as an electron-donating group. These carbazole groups are coupled to each other not through a conjugated system. However, it was confirmed from the absorption spectrum of the substance represented by the chemical formula (20) that these carbazole groups were spatially overlapped with each other. Namely, when hole is injected into one of these carbazole groups, the electron cloud thereof would be increasingly overlapped with the other carbazole group which is being overlapped therewith.

By using the optical recording medium thus obtained, the recording of information was performed under the same conditions as employed in Example 1. As a result, it was found possible to sufficiently achieve the recording within 10 seconds. The information thus recorded was found possible to be reconstructed even one month later.

COMPARATIVE EXAMPLE 1

A co-solvent solution was prepared by repeating the same procedures as set forth in Example 4 except that 4-(dimethyl amino) benzalrehyde-diphenylhydrazone (DEH) was employed as a trapping material in place of the trapping material employed in Example 4.

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

When the recording of information was performed under the same conditions as employed in Example 1, it took 30 seconds for performing the recording. The reason for this may be attributed to the fact that since there was a large difference in ionization potential between the charge-accepting group of the PVK and the charge-donating group of the DEH, it was more difficult for a hole to be transported from PVK to DEH. In spite of this, the information thus recorded was found impossible to be reconstructed 30 minutes after the recording. This may be attributed to the fact that since a couple of phenyl groups in the DEH were directly bonded to amino group having electron donativity, it was impossible to bring about a sufficient change in molecular geometry inside the polymer, so that the retention life of electric charge was not sufficiently long.

COMPARATIVE EXAMPLE 2

A co-solvent solution was prepared by repeating the same procedures as set forth in Example 4 except that the compound represented by the following chemical formula (21) was employed as a trapping material in place of the trapping material employed in Example 4.

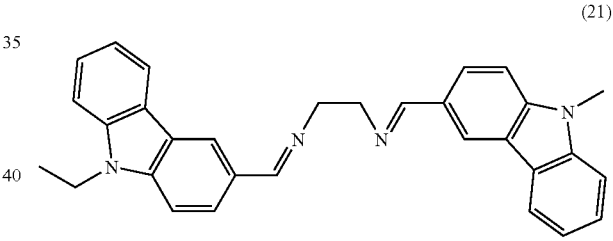

(21)

Then, by the same procedures as set forth in Example 1, the co-solvent solution thus obtained was coated on the surface of substrate to form a recording layer having a thickness of 50 μm. Further, this recording layer was subjected to a poling treatment at a temperature of 80° C., with both electrodes thereof being connected with a power source of 3 kV, to prepare an optical recording medium.

By using the optical recording medium thus obtained, the recording of information was tried under the same conditions as employed in Example 1.

As a result, it was impossible to observe a reconstructed beam within several seconds after the termination of the irradiation of recording beam. This may be attributed to the fact that in the compound represented by the chemical formula (21) and employed as a trapping material, a couple of carbazole groups were coupled to each other not through a conjugated system. Namely, it is assumed that even though the transport of electric charge from the PVK to the substance represented by the chemical formula (21) might have been quite easy, it was impossible to stably retain the electric charge on the surface of the substance represented by the chemical formula (21), thereby permitting the aforementioned phenomenon to generate.

COMPARATIVE EXAMPLE 3

A co-solvent solution was prepared by repeating the same procedures as set forth in Example 4 except that the compound represented by the following chemical formula (22) was employed as a trapping material in place of the trapping material employed in Example 4. Namely, in this Comparative Example, the compound represented by the chemical formula (22) was employed to function as a trapping material.

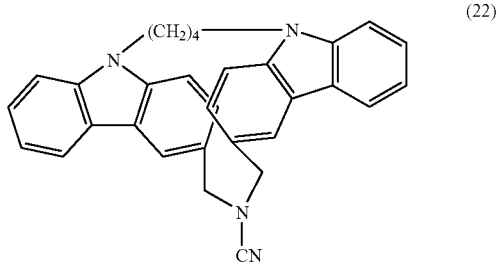

(22)

Then, by the same procedures as set forth in Example 1, the co-solvent solution thus obtained was coated on the surface of substrate to form a recording layer having a thickness of 50 µm. Further, this recording layer was subjected to a poling treatment at a temperature of 80° C., with both electrodes thereof being connected with a power source of 3 kV, to prepare an optical recording medium.

By using the optical recording medium thus obtained, the recording of information was tried under the same conditions as employed in Example 1.

The compound represented by the chemical formula (22) and employed as a trapping material is similar in structure to the compound represented by the aforementioned chemical formula (20). However, it was confirmed from the absorption spectrum thereof that a couple of carbazole groups therein were not spatially overlapped with each other. Namely, even if hole is injected into one of the carbazole groups, it would be impossible to realize the overlapping of the electron clouds.

When the recording of information was tried under the same conditions as employed in Example 1 by using this optical recording medium, it was impossible to observe a reconstructed beam within several seconds after the shut-off of recording beam.

EXAMPLE 13

0.4% by weight of $C_{70}$, 39.6% by weight of PVK, 15% by weight of EtCz, 15% by weight of Bis CzPro and 30% by weight of the compound represented by the aforementioned chemical formula (11) were dissolved in a mixture of THF and toluene to prepare a co-solvent solution. The compound represented by the chemical formula (11) was capable of functioning as a trapping material. Since the content of this compound was 30% by weight, it was possible to bring about the changes of the optical characteristics of this trapping material through the irradiation of beam, thereby making it possible to record information.

Then, by the same procedures as set forth in Example 1, the co-solvent solution thus obtained was coated on the surface of substrate to form a recording layer having a thickness of 50 µm, thus manufacturing an optical recording medium.

By using a recording apparatus constructed as shown in FIG. 5, the recording and reading hologram were performed as follows. In the operation of this recording apparatus shown in FIG. 5, the beam emitted from a He—Ne laser (output: 30 mW) 10 was at first split into two by a beam splitter 12. One of the beams which was reflected by the beam splitter 12 was passed through a beam expander 11 to expand the diameter of the beam and then, permitted to pass through a liquid crystal filter 15 functioning as an image display element. This liquid crystal filter 15 was designed such that the transmissivity thereof was modulated in advance in conformity with the information to be recorded, and that the transmitted beam was turned into a signal beam 4, which was then converged by a lens 16 (focal length: 150 mm). The distance between the lens 16 and the optical recording medium 7 was set to 135 mm.

On the other hand, the other beam passed through the beam splitter 12 was converged by a lens 17 (focal length: 150 mm) to produce a reference beam 5. In this case, the distance between the lens 17 and the optical recording medium was set to 70 mm, and the path of the reference beam 5 was adjusted so as to enable the reference beam to cover the converged region of the signal beam 4 on the surface of the optical recording medium. When the angles of incidence of the signal beam 4 and the reference beam 5 irradiated onto the surface of the optical recording medium 7 were measured outside the optical recording medium 7, the angles of incidence relative to the normal line of the optical recording medium 7 were found 30 degrees and 60 degrees, respectively.

Since the substrate of the optical recording medium 7 was connected with the external power source (not shown) of 3 kV, an external electric field of 60 V/µm was applied to the recording layer. When the beams were irradiated in this manner onto the optical recording medium 7 for one second, a hologram was enabled to be recorded in the optical recording medium 7.

Subsequently, the information thus recorded was read as follows. On the occasion of this reading, the path of the signal beam 4 was shut off by a shutter. Then, the beam which had passed through the beam splitter 12 was irradiated, as a reading beam, onto the optical recording medium 7 to generate a reconstructed beam. After permitting this reconstructed beam to pass through a lens 18 (focal length: 150 mm) of the same construction as the lens 16, this reconstructed beam was permitted to enter into a CCD 19 functioning as a reading apparatus. As a result, a reconstructed beam having the same intensity distribution as that of the signal beam 4 was detected. In this case, the lens 18 was disposed perpendicular to the axis of beam and at a position which was spaced 300 mm away from the lens 16 so as to enable the axis of beam to align with the center of the lens 18. The CCD 19 was also disposed perpendicular to the axis of beam. The distance between the lens 18 and the CCD 19 was set equal to the focal length of the lens 18.

The information thus recorded was found possible to be reconstructed even one month later.

EXAMPLE 14

0.3% by weight of $C_{70}$, 44.7% by weight of PS, 15% by weight of the compound represented by the aforementioned chemical formula (5a), 5% by weight of triphenyl amine, and 35% by weight of the compound represented by the aforementioned chemical formula (15) were dissolved in a mixture of THF and toluene to prepare a co-solvent solution. The compound represented by the chemical formula (15)

was capable of functioning as a trapping material. Since the content of this compound was 35% by weight, it was possible to bring about the changes of the optical characteristics of this trapping material through the irradiation of beam, thereby making it possible to record information.

Then, by the same procedures as set forth in Example 1, the co-solvent solution thus obtained was coated on the surface of substrate to form a recording layer having a thickness of 50 µm, thus manufacturing an optical recording medium.

By using the optical recording medium thus obtained, the recording of information was performed under the same conditions as employed in Example 13. As a result, it was found possible to sufficiently achieve the recording within 5 seconds. The information thus recorded was found possible to be reconstructed even one month later.

EXAMPLE 15

The co-solvent solution obtained in Example 14 was coated on the surface of glass plate having no deposition of ITO film by a casting method, and the resultant layer was treated in the same manner as in Example 1 to form a recording layer having a thickness of 50 µm, thus manufacturing an optical recording medium.

By using this optical recording medium, the recording of information was performed under the same conditions as those of Example 13 excepting that no external electric field was applied thereon. As a result, it was possible to record the information even though it took 60 seconds for the recording.

The information thus recorded was found possible to be reconstructed even one month later.

EXAMPLE 16

0.3% by weight of $C_{70}$, 49.7% by weight of PS, 15% by weight of the compound represented by the aforementioned chemical formula (5a), and 35% by weight of the compound represented by the aforementioned chemical formula (16) were dissolved in a mixture of THF and toluene to prepare a co-solvent solution. The compound represented by the chemical formula (16) was capable of functioning as a trapping material. Since the content of this compound was 35% by weight, it was possible to bring about the changes of the optical characteristics of this trapping material through the irradiation of beam, thereby making it possible to record information.

Then, by the same procedures as set forth in Example 1, the co-solvent solution thus obtained was coated on the surface of substrate to form a recording layer having a thickness of 50 µm, thus manufacturing an optical recording medium.

By using this optical recording medium thus obtained, the recording of information was performed under the same conditions as employed in Example 13. As a result, it was found possible to sufficiently achieve the recording within one second. The information thus recorded was found possible to be reconstructed even one month later.

EXAMPLE 17

A co-solvent solution was prepared by repeating the same procedures as set forth in Example 14 except that the compound represented by the aforementioned chemical formula (17) was employed as a trapping material in place of the trapping material employed in Example 14.

Then, by the same procedures as set forth in Example 1, the co-solvent solution thus obtained was coated on the surface of substrate to form a recording layer having a thickness of 50 µm, thus manufacturing an optical recording medium.

By using the optical recording medium thus obtained, the recording of information was performed under the same conditions as employed in Example 13. As a result, it was found possible to sufficiently achieve the recording within 5 seconds. The information thus recorded was found possible to be reconstructed even one month later.

EXAMPLE 18

A co-solvent solution was prepared by repeating the same procedures as set forth in Example 16 except that the compound represented by the aforementioned chemical formula (18) was employed as a trapping material in place of the trapping material employed in Example 16.

Then, by the same procedures as set forth in Example 1, the co-solvent solution thus obtained was coated on the surface of substrate to form a recording layer having a thickness of 50 µm, thus manufacturing an optical recording medium.

By using the optical recording medium thus obtained, the recording of information was performed under the same conditions as employed in Example 13. As a result, it was found possible to sufficiently achieve the recording within one second. The information thus recorded was found possible to be reconstructed even one month later.

EXAMPLE 19

A co-solvent solution was prepared by repeating the same procedures as set forth in Example 16 except that the compound represented by the aforementioned chemical formula (19) was employed as a trapping material in place of the trapping material employed in Example 16.

Then, by the same procedures as set forth in Example 1, the co-solvent solution thus obtained was coated on the surface of substrate to form a recording layer having a thickness of 50 µm, thus manufacturing an optical recording medium.

By using the optical recording medium thus obtained, the recording of information was performed under the same conditions as employed in Example 13. As a result, it was found possible to sufficiently achieve the recording within one second. The information thus recorded was found possible to be reconstructed even one month later.

EXAMPLE 20

A co-solvent solution was prepared by repeating the same procedures as set forth in Example 13 except that the compound represented by the aforementioned chemical formula (20) was employed as a trapping material in place of the trapping material employed in Example 13.

Then, by the same procedures as set forth in Example 1, the co-solvent solution thus obtained was coated on the surface of substrate to form a recording layer having a thickness of 50 µm, thus manufacturing an optical recording medium.

By using the optical recording medium thus obtained, the recording of information was performed under the same conditions as employed in Example 13. As a result, it was found possible to sufficiently achieve the recording within 10 seconds. The information thus recorded was found possible to be reconstructed even one month later.

The reason for this can be attributed to the fact that, as explained with reference to Example 12, the compound represented by the chemical formula (20) was capable of functioning as a trapping material.

EXAMPLE 21

By using the optical recording medium manufactured in Example 5, the recording of information was performed under the same conditions as employed in Example 13. As a result, it was found possible to sufficiently achieve the recording within 10 seconds. The information thus recorded was found possible to be reconstructed even one month later.

EXAMPLE 22

By using the optical recording medium manufactured in Example 11, the recording of information was performed under the same conditions as employed in Example 13. As a result, it was found possible to sufficiently achieve the recording within 10 seconds. The information thus recorded was found possible to be reconstructed even one month later.

COMPARATIVE EXAMPLE 4

A co-solvent solution was prepared by repeating the same procedures as set forth in Example 13 except that DEH was employed as a trapping material in place of the trapping material employed in Example 13.

Then, by the same procedures as set forth in Example 1, the co-solvent solution thus obtained was coated on the surface of substrate to form a recording layer having a thickness of 50 µm, thus manufacturing an optical recording medium.

When the recording of information was tried by using the optical recording medium under the same conditions as employed in Example 13, it was impossible to perform the recording. In the case of the DEH, a couple of phenyl groups, relatively large in structure, were directly bonded to amino group having electron donativity. Therefore, it was impossible to bring about a sufficient change in molecular geometry inside the polymer, so that the structural change on the occasion when electric charge was retained therein was relatively small, thus making it impossible to bring about a sufficient change in the optical characteristics of the recording layer.

COMPARATIVE EXAMPLE 5

A co-solvent solution was prepared by repeating the same procedures as set forth in Example 13 except that the compound represented by the aforementioned chemical formula (21) was employed as a trapping material in place of the trapping material employed in Example 13.

Then, by the same procedures as set forth in Example 1, the co-solvent solution thus obtained was coated on the surface of substrate to form a recording layer having a thickness of 50 µm, thus manufacturing an optical recording medium.

When the recording of information was tried by using the optical recording medium under the same conditions as employed in Example 13, it was impossible to perform the recording. In the case of the compound represented by the aforementioned chemical formula (21), a couple of carbazole groups having electron-donativity were coupled with each other not through a conjugated system. Therefore, it was impossible to bring about a sufficient change in the optical characteristics of the recording layer on the occasion when electric charge was retained therein.

COMPARATIVE EXAMPLE 6

A co-solvent solution was prepared by repeating the same procedures as set forth in Example 13 except that the compound represented by the aforementioned chemical formula (22) was employed as a trapping material in place of the trapping material employed in Example 13.

Then, by the same procedures as set forth in Example 1, the co-solvent solution thus obtained was coated on the surface of substrate to form a recording layer having a thickness of 50 µm, thus manufacturing an optical recording medium.

When the recording of information was tried by using the optical recording medium under the same conditions as employed in Example 13, it was impossible to perform the recording. In the case of the compound represented by the aforementioned chemical formula (22), a couple of carbazole groups having electron-donativity were incapable of interacting with each other.

EXAMPLE 23

The co-solvent solution prepared in the aforementioned Example 1 was dropped and coated on the surface of glass substrate by a casting method to form a recording layer, thus obtaining the optical recording medium. Glass substrates used in this Example were not ITO deposited. On this occasion, the thickness of this recording layer was adjusted to 250 µm by using a Teflon (registered trademark) spacer. Further, the glass plate disposed on the objective lens side was quenched to remove the glass plate, thus obtaining the optical recording medium.

By using a recording apparatus constructed as shown in FIG. 7, the recording and reading data were performed as follows. In the operation of this recording apparatus shown in FIG. 7, the output beam emitted from a semiconductor laser was shaped into a parallel beam by a collimator lens and then, converged in the optical recording medium by an objective lens. In this case, in order to enable the beam to converge at any desired position in the depth-wise direction of the recording layer, a lens (NIKON Co., Ltd., tradename: CF IC LCD Plan CR, magnification: 100 times), which is long in operating distance and large in NA (Numerical Aperture), was employed.

First of all, an injection current to the semiconductor laser was minimized and the intensity of irradiating beam was sufficiently lowered, under which conditions the position where the semiconductor laser was intended to be converged was aligned with the surface of the recording layer. Subsequently, under the condition where the irradiation of beam was stopped, the stage was moved so as to enable the beam to focus at a position spaced 10 µm away from the surface of the recording layer.

Thereafter, a recording beam was irradiated by enlarging the injection current for a predetermined period of time. Further, in order to perform the recording of information at a different position in depth-wise of the recording layer, the stage was moved, while stopping the irradiation of beam, so as to move the focal point to a position which was 30 µm deeper than the previous position. In order to record information at this position, the injection current was modulated for irradiating a recording beam. These procedures were repeated to record four data at different depths within the recording layer. As described above, by using the stage and while stopping the irradiation of beam, the focal point is moved to a desired region before performing the irradiation of a recording beam for a predetermined period of time, thereby making it possible to record information at a desired region within the recording layer.

Thereafter, by using the stage and while stopping the irradiation of beam, the optical recording medium was moved so as to enable the axis of beam to pass through the center of the recording region and also enable the focal point to be positioned at a region which was 5 μm deeper than the previous recorded region. Then, the injection current was modulated so as to make the quantity of beam smaller than the recording beam by a magnitude of about 1/100, and the intensity, at this region, of transmitted beam "$I_s$" was measured with a detector lying on the optical axis of the beam. Then, the ratio between this intensity of beam "$I_s$" and the intensity of beam "$I_r$" that had been measured in advance by irradiating the same quantity of beam into the recording layer was determined. As a result, the ratio $I_s/I_r$ was 1.2. On the other hand, when the position of focus was sufficiently spaced away from the recording region, the ratio $I_s/I_r$ was 1.0.

EXAMPLE 24

0.5% by weight of $C_{70}$, 34.5% by weight of PS, 30% by weight of the charge-transport material represented by the aforementioned chemical formula (5b), 30% by weight of DBMNA, and 5% by weight of the compound represented by the aforementioned chemical formula (16) as a trapping material were dissolved in a mixture of THF and toluene to prepare a co-solvent solution.

Then, by the same procedures as set forth in Example 23, the co-solvent solution thus obtained was coated on the surface of substrate to form a recording layer having a thickness of 250 μm, thus manufacturing an optical recording medium. By using the optical recording medium thus obtained, the irradiation of beam for a period of one second was repeated in the same manner as in Example 23, thereby sequentially obtaining four data. Then the ratio $I_s/I_r$ was found to be 1.3.

EXAMPLE 25

By the same procedures as set forth in Example 23, the co-solvent solution prepared in Example 5 was coated on the surface of substrate to form a recording layer having a thickness of 250 μm, thus manufacturing an optical recording medium. By using the optical recording medium thus obtained, the irradiation of beam for a period of one second was repeated in the same manner as in Example 23, thereby sequentially obtaining four data. Then the ratio $I_s/I_r$ was found to be 1.4.

EXAMPLE 26

By the same procedures as set forth in Example 23, the co-solvent solution prepared in Example 11 was coated on the surface of substrate to form a recording layer having a thickness of 250 μm, thus manufacturing an optical recording medium. By using the optical recording medium thus obtained, the irradiation of beam for a period of one second was repeated in the same manner as in Example 23, thereby sequentially obtaining four data. Then the ratio $I_s/I_r$ was found to be 1.2.

EXAMPLE 27

By the same procedures as set forth in Example 23, the co-solvent solution prepared in Example 16 was coated on the surface of substrate to form a recording layer having a thickness of 250 μm, thus manufacturing an optical recording medium. By using the optical recording medium thus obtained, the irradiation of beam for a period of one second was repeated in the same manner as in Example 23, thereby sequentially obtaining four data. Then the ratio $I_s/I_r$ was found to be 1.3.

COMPARATIVE EXAMPLE 7

By the same procedures as set forth in Example 23, the co-solvent solution prepared in Comparative Example 4 was coated on the surface of substrate to form a recording layer having a thickness of 250 μm, thus manufacturing an optical recording medium. By using the optical recording medium thus obtained, the irradiation of beam for a period of one second was repeated in the same manner as in Example 23, thereby sequentially obtaining four data. Then the ratio $I_s/I_r$ was found to be approximately 1.

COMPARATIVE EXAMPLE 8

By the same procedures as set forth in Example 23, the co-solvent solution prepared in Comparative Example 5 was coated on the surface of substrate to form a recording layer having a thickness of 250 μm, thus manufacturing an optical recording medium. By using the optical recording medium thus obtained, the irradiation of beam for a period of one second was repeated in the same manner as in Example 23, thereby sequentially obtaining four data. Then the ratio $I_s/I_r$ was found to be approximately 1.

COMPARATIVE EXAMPLE 9

By the same procedures as set forth in Example 23, the co-solvent solution prepared in Comparative Example 6 was coated on the surface of substrate to form a recording layer having a thickness of 250 μm, thus manufacturing an optical recording medium. By using the optical recording medium thus obtained, the irradiation of beam for a period of one second was repeated in the same manner as in Example 23, thereby sequentially obtaining four data. Then the ratio $I_s/I_r$ was found to be approximately 1.

As explained above, it is possible, according to the present invention, to provide an optical recording medium wherein information is enabled to be recorded as a hologram, and the time required for the recording can be shortened while ensuring a practical recording life. Further, it is possible, according to the present invention, to provide an optical recording apparatus which is designed to record information through such an optical recording medium.

The optical recording medium according to the present invention is useful in realizing a high-density recording and hence is very valuable in industrial viewpoint.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical recording medium comprising a recording layer consisting of a matrix polymer; a charge-generating material capable of generating an electron and a hole by light irradiation; a charge-transport material enabling at least said hole to be transported to isolate said electron and said hole; and a trapping material retaining said hole, the optical characteristics of said recording layer being changed in accordance with changes in spatial distribution of said hole and said electron, and said trapping material being a molecule represented by the following general formula (A):

(A)

wherein CB1 is a conjugated system; and $R^a$ and $R^b$ may be the same with or different from each other and are individually a group having electron donativity, at least one of $R^a$ and $R^b$ being a nitrogen-containing heterocyclic group selected from the following groups and bonded through an unsaturated carbon atom of said heterocyclic group to said conjugated system:

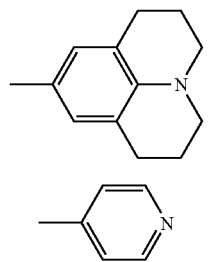

(1c)

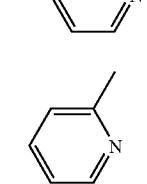

(1d)

(1e)

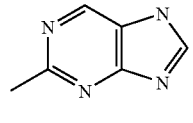

(1f)

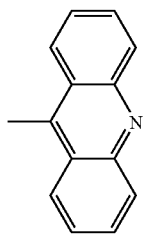

(1g)

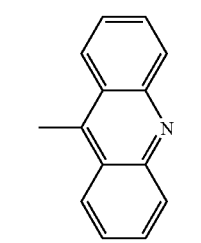

(1h)

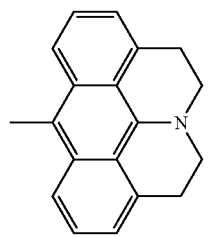

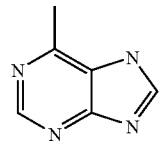

(1i)

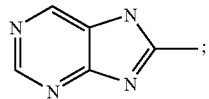

(1j)

and wherein and the other of $R^a$ and $R^b$ may be a residual group having electron donativity and being other than said nitrogen-containing heterocyclic group is at least one selected from the group consisting of allyl alkane; nitrogen-containing cyclic compound; oxygen-containing compound; sulfur-containing compound; and the following groups:

(1a)

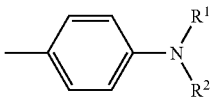

(1b)

wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom.

2. The optical recording medium according to claim 1, wherein said conjugated system CB1 in said general formula (A) is selected from the groups shown below:

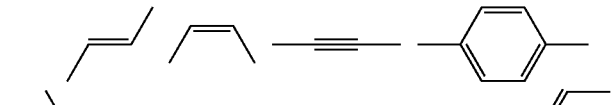

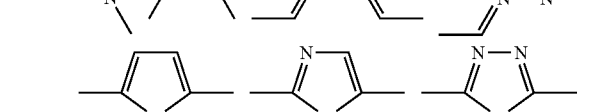

-continued

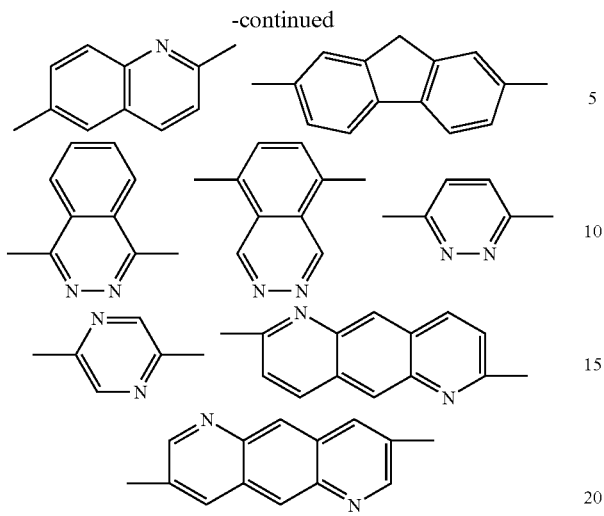

wherein X is nitrogen atom, oxygen atom or sulfur atom.

3. The optical recording medium according to claim 1, wherein said conjugated system CB1 in said general formula (A) is selected from the groups shown below:

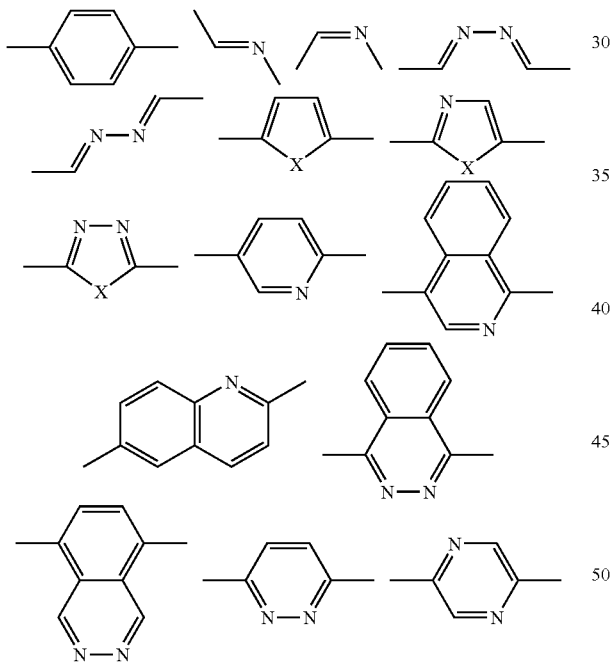

wherein X is nitrogen atom, oxygen atom or sulfur atom.

4. The optical recording medium according to claim 1, wherein $R^a$ is a group represented by the formula (1c) or (1h).

5. An optical recording medium comprising a recording layer consisting of a matrix polymer; a charge-generating material capable or generating an electron and a hole by light irradiation; a charge-transport material enabling at least said hole to be transported to isolate said electron and said hole; and a trapping material retaining said hole, the optical characteristics of said recording layer being changed in accordance with changes in spatial distribution of said hole and said electron, and said trapping material being a molecule represented by the following general formula (B):

wherein CB1 is a conjugated system; and $R^C$ is a nitrogen-containing heterocyclic group selected from the groups shown below and bonded through an unsaturated carbon atom of said heterocyclic group to said conjugated system:

(1c)

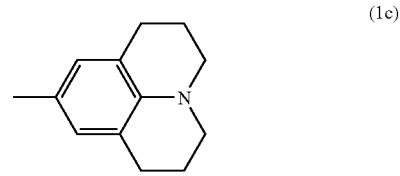

(1d)

(1e)

(1f)

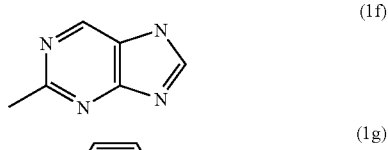

(1g)

(1h)

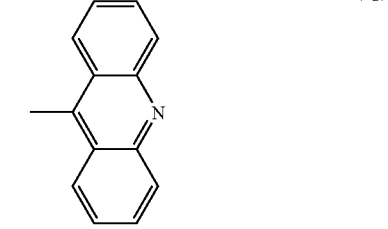

(1i)

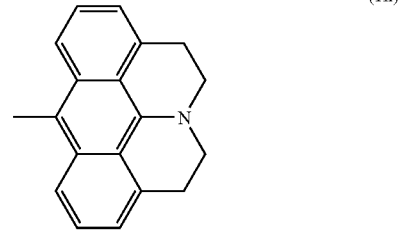

(1j)

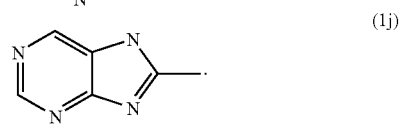

6. The optical recording medium according to claim 5, wherein said conjugated system CB1 in said general formula (B) is selected from the groups shown below:

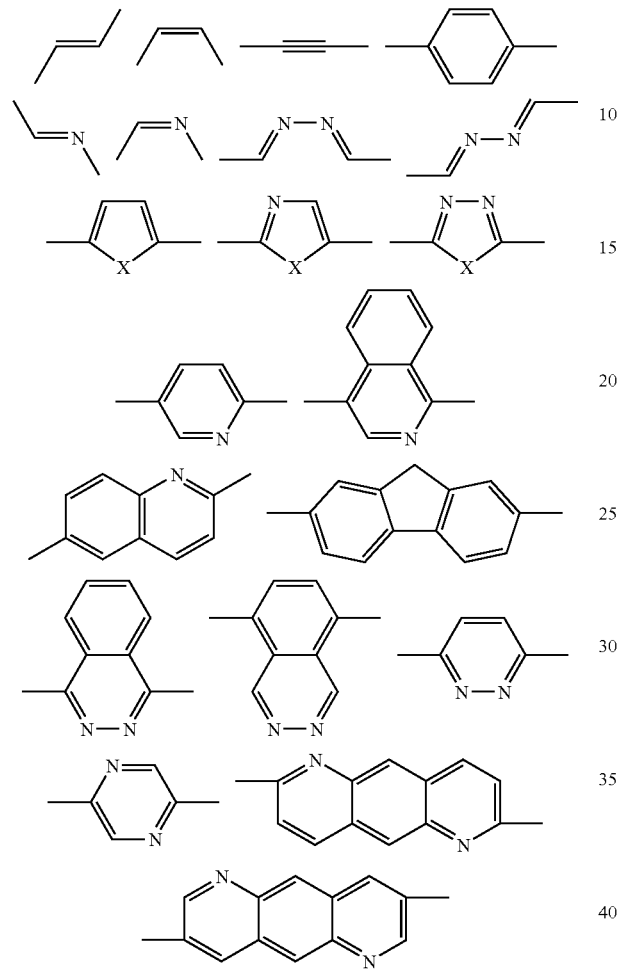

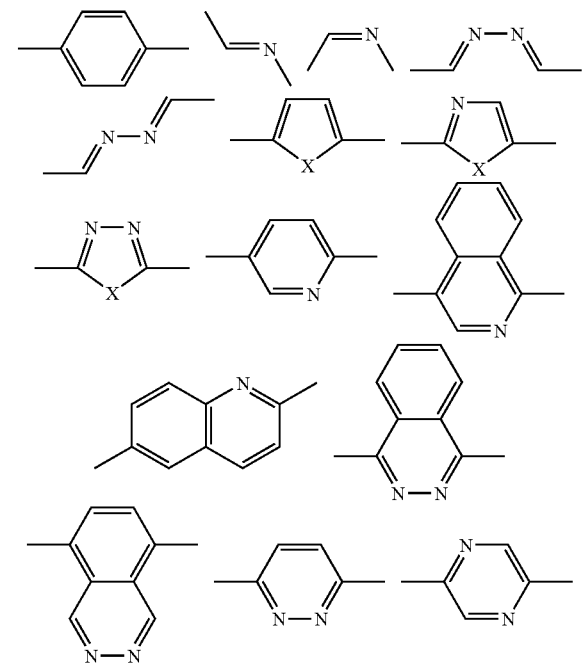

wherein x is nitrogen atom, oxygen atom or sulfur atom.

7. The optical recording medium according to claim 5, wherein $R^c$ is a group represented by the formula (1c) or (1h).

8. An optical recording medium comprising a recording layer consisting of a matrix polymer; a charge-generating material capable of generating an electron and a hole by light irradiation; a charge-transport material enabling at least said hole to be transported to isolate said electron and said hole; and a trapping material retaining said hole, the optical characteristics of said recording layer being changed in accordance with changes in spatial distribution of said hole and said electron, and said trapping material being a molecule represented by the following general formula (C):

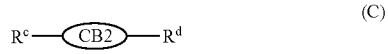
(C)

wherein CB2 is a conjugated system selected from the groups shown below:

wherein X is nitrogen atom, oxygen atom or sulfur atom; and $R^c$ is a nitrogen-containing heterocyclic group selected from the groups shown below and bonded through an unsaturated carbon atom of said heterocyclic group to said conjugated system:

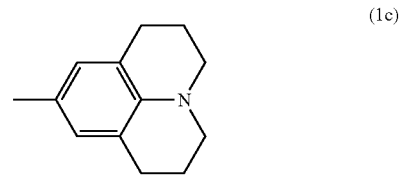
(1c)

(1d)

(1e)

(1f)

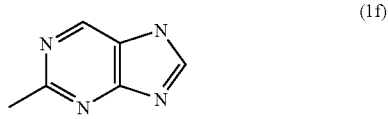

(1g)

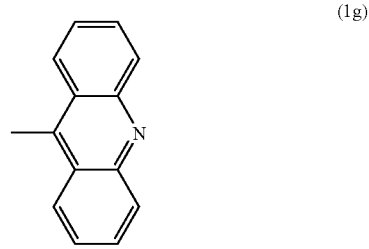

-continued

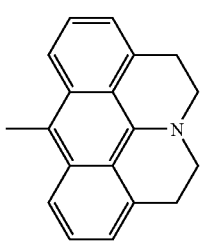
(1h)

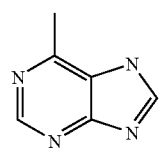
(1i)

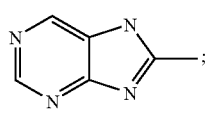
(1j)

and $R^d$ is a nitrogen-containing heterocyclic group and bonded through an unsaturated carbon atom of said heterocyclic group to said conjugated system, or may be selected from a group shown below:

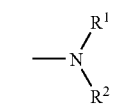
(1a)

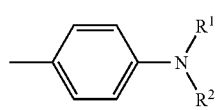
(1b)

wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom.

9. The optical recording medium according to claim 8, wherein said $R^d$ in said general formula (C) is a compound represented by said general formula (1a) or (1b).

10. The optical recording medium according to claim 8, wherein $R^c$ is a group represented by the formula (1c) or (1h).

11. An optical recording apparatus comprising:
a light source emitting a beam;
a beam splitter separating said beam into two beams;
a first optical device which is configured to provide one of these separated beams with information to be recorded;
an optical medium comprising a recording layer consisting of a matrix polymer; a charge-generating material capable of generating an electron and a hole by light irradiation; a charge-transport material enabling at least said hole to be transported to isolate said electron and said hole; and a trapping material retaining said hole, the optical characteristics of said recording layer being changed in accordance with changes in spatial distribution of said hole and said electron; and
a second optical device which is configured to directing said separated beams so as to intersect each other within said recording medium, said separated beams making interference fringes within said recording layer of said optical recording medium to write information;
wherein said trapping material is a molecule represented by the following general formula (A):

(A)

wherein CB1 is a conjugated system; and $R^a$ and $R^b$ may be the same with or different from each other and are individually a group having electron donativity, at least one of $R^a$ and $R^b$ being a nitrogen-containing heterocyclic group selected from the following groups and bonded through an unsaturated carbon atom of said heterocyclic group to said conjugated system:

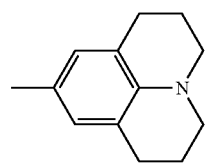
(1c)

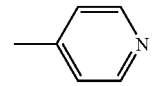
(1d)

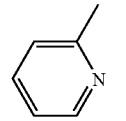
(1e)

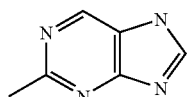
(1f)

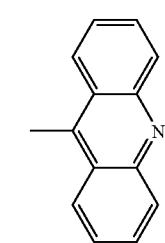
(1g)

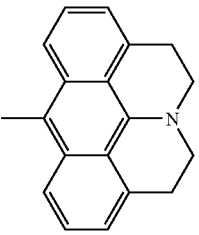
(1h)

-continued

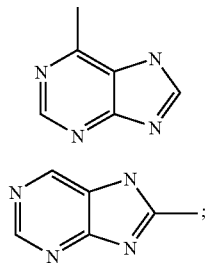
(1i)

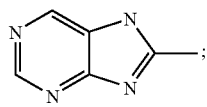
(1j)

and wherein a residual group having electron donativity and being other than said nitrogen-containing heterocyclic group is at least one selected from the group consisting of allyl alkane; nitrogen-containing cyclic compound; oxygen-containing compound; sulfur-containing compound; and the following groups:

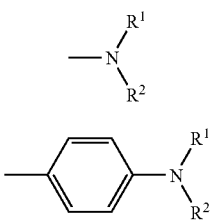
(1a)

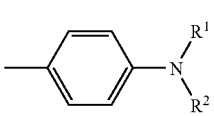
(1b)

wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom.

12. An optical recording apparatus comprising:
a light source emitting a beam;
a beam splitter separating said beam into two beams;
a first optical device which is configured to provide one of these separated beams with information to be recorded;
an optical medium comprising a recording layer consisting of a matrix polymer; a charge-generating material capable of generating an electron and a hole by light irradiation; a charge-transport material enabling at least said hole to be transported to isolate said electron and said hole; and a trapping material retaining said hole, the optical characteristics of said recording layer being changed in accordance with changes in spatial distribution of said hole and said electron; and
a second optical device which is configured to directing said separated beams so as to intersect each other within said recording medium, said separated beams making interference fringes within said recording layer of said optical recording medium to write information;
wherein said trapping material is a molecule represented by the following general formula (B):

(B)

wherein CB1 is a conjugated system; and $R^C$ is a nitrogen-containing heterocyclic group selected from the groups shown below and bonded through an unsaturated carbon atom of said heterocyclic group to said conjugated system:

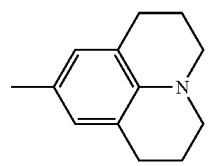
(1c)

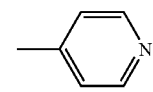
(1d)

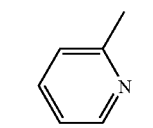
(1e)

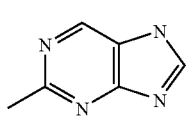
(1f)

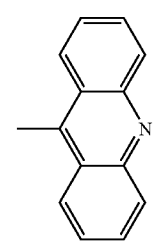
(1g)

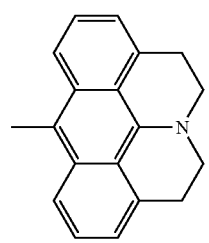
(1h)

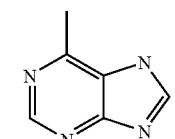
(1i)

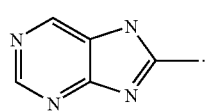
(1j)

13. An optical recording apparatus comprising:

a light source emitting a beam;

a beam splitter separating said beam into two beams;

a first optical device which is configured to provide one of these separated beams with information to be recorded;

an optical medium comprising a recording layer consisting of a matrix polymer; a charge-generating material capable of generating an electron and a hole by light irradiation; a charge-transport material enabling at least said hole to be transported to isolate said electron and said hole; and a trapping material retaining said hole, the optical characteristics of said recording layer being changed in accordance with changes in spatial distribution of said hole and said electron; and a second optical device which is configured to directing said separated beams so as to intersect each other within said recording medium, said separated beams making interference fringes within said recording layer of said optical recording medium to write information;

wherein said trapping material is a molecule represented by the following general formula (C):

$$R^c \text{---} \boxed{CB2} \text{---} R^d \qquad (C)$$

wherein CB2 is a conjugated system selected from the groups shown below:

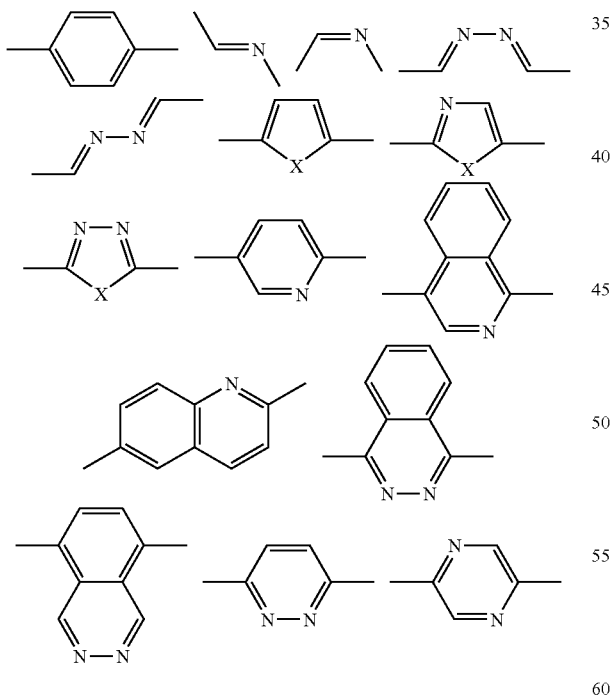

wherein X is nitrogen atom, oxygen atom or sulfur atom; and $R^c$ is a nitrogen-containing heterocyclic group selected from the groups shown below and bonded through an unsaturated carbon atom of said heterocyclic group to said conjugated system:

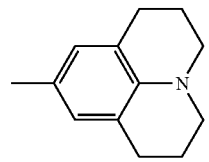 (1c)

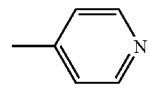 (1d)

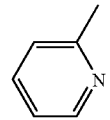 (1e)

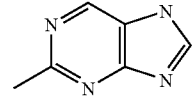 (1f)

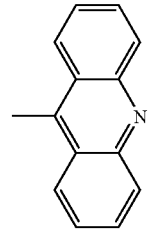 (1g)

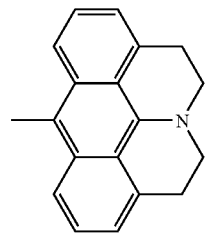 (1h)

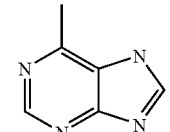 (1i)

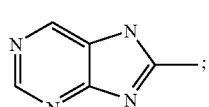 (1j)

and $R^d$ is a nitrogen-containing heterocyclic group and bonded through an unsaturated carbon atom of said heterocyclic group to said conjugated system, or may be selected from the group shown below:

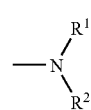 (1a)

-continued

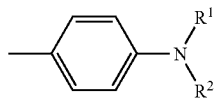

(1b)

wherein $R^1$ and $R^2$ may be the same with or different from each other and are individually hydrogen atom, alkyl group, alkoxy group, phenyl group, naphthyl group, tolyl group, benzyl group, benzothiazole group, benzoxazolyl group, benzopyrrol group, benzoimidazolyl group, naphthothiazolyl group, naphthoxazolyl group, naphthopyrrol group, naphthoimidazolyl group or hydroxyl group; at least one of $R^1$ and $R^2$ being hydrogen atom, or a group to be bonded, through oxygen atom or saturated carbon atom, to nitrogen atom.

* * * * *